(12) United States Patent
Yamagishi et al.

(10) Patent No.: US 12,520,614 B2
(45) Date of Patent: Jan. 6, 2026

(54) SOLID-STATE IMAGE SENSOR, METHOD FOR PRODUCING SOLID-STATE IMAGE SENSOR, AND ELECTRONIC DEVICE

(71) Applicant: SONY GROUP CORPORATION, Tokyo (JP)

(72) Inventors: Hajime Yamagishi, Kanagawa (JP); Rena Kagawa, Kanagawa (JP); Yuusaku Kobayashi, Nagasaki (JP); Yutaka Nishimura, Kanagawa (JP); Makoto Hayafuchi, Fukuoka (JP); Hayato Gouji, Fukuoka (JP); Natsuhiro Aota, Fukuoka (JP)

(73) Assignee: Sony Group Corporation, Tokyo (JP)

( * ) Notice: Subject to any disclaimer, the term of this patent is extended or adjusted under 35 U.S.C. 154(b) by 694 days.

(21) Appl. No.: 17/861,982

(22) Filed: Jul. 11, 2022

(65) Prior Publication Data

US 2022/0415956 A1    Dec. 29, 2022

Related U.S. Application Data

(63) Continuation of application No. 16/086,362, filed as application No. PCT/JP2017/008404 on Mar. 3, 2017, now abandoned.

(30) Foreign Application Priority Data

Mar. 30, 2016  (JP) .................................. 2016-069624

(51) Int. Cl.
*H10F 39/00*       (2025.01)
*H10F 39/12*       (2025.01)

(52) U.S. Cl.
CPC ......... *H10F 39/809* (2025.01); *H10F 39/018* (2025.01); *H10F 39/811* (2025.01); *H10F 39/199* (2025.01); *H10F 39/8057* (2025.01)

(58) Field of Classification Search
CPC ............................ H10F 39/809; H10F 39/811
See application file for complete search history.

(56) References Cited

U.S. PATENT DOCUMENTS

| 9,171,875 B2 | 10/2015 | Hayashi |
| 2006/0146233 A1 | 7/2006 | Park |

(Continued)

FOREIGN PATENT DOCUMENTS

| CN | 102918648 A | 2/2013 |
| JP | 2012-164870 | 8/2012 |
| JP | 2015128187 A | 7/2015 |
| WO | WO 2012/161044 | 11/2012 |

OTHER PUBLICATIONS

International Search Report and Written Opinion for International (PCT) Patent Application No. PCT/JP2017/008404, dated May 9, 2017, 8 pages.

(Continued)

*Primary Examiner* — Peter M Albrecht
(74) *Attorney, Agent, or Firm* — SHERIDAN ROSS P.C.

(57) ABSTRACT

To provide a solid-state image sensor in which two or more semiconductor chips are bonded together without voids occurring in their bonding surfaces despite the conductive films bonded together at a high areal ratio. The solid-state image sensor includes at least a first semiconductor chip carrying thereon one or more than one of a first conductor and a pixel array, and a second semiconductor chip which bonds to the first semiconductor chip and carries thereon one or more than one of a second conductor and a logic circuit, with the first semiconductor chip and the second semiconductor chip bonding together in such a way that the first conductor and the second conductor overlap with each other and are electrically connected to each other, and the bonding (Continued)

occurring such that the first conductor and the second conductor differ from each other in the area of their bonding surfaces.

20 Claims, 17 Drawing Sheets

(56) References Cited

U.S. PATENT DOCUMENTS

| | | |
|---|---|---|
| 2012/0199930 A1 | 8/2012 | Hayashi |
| 2014/0145338 A1 | 5/2014 | Fujii et al. |
| 2015/0179691 A1 | 6/2015 | Yanagita et al. |
| 2015/0279816 A1 | 10/2015 | Chen et al. |
| 2016/0020240 A1 | 1/2016 | Hayashi |
| 2017/0053961 A1 | 2/2017 | Hayashi |
| 2017/0154873 A1* | 6/2017 | Kim ................. H10F 39/809 |
| 2017/0170224 A1 | 6/2017 | Huang et al. |
| 2019/0115387 A1 | 4/2019 | Yamagishi et al. |

OTHER PUBLICATIONS

Official Action (with English translation) for Japanese Patent Application No. 2018-508850, dated Dec. 1, 2021, 10 pages.
Official Action for U.S. Appl. No. 16/086,362, dated Aug. 21, 2019, 9 pages. Restriction Requirement.
Official Action for U.S. Appl. No. 16/086,362, dated Dec. 10, 2019, 11 pages.
Official Action for U.S. Appl. No. 16/086,362, dated Apr. 3, 2020, 9 pages.
Official Action for U.S. Appl. No. 16/086,362, dated Nov. 10, 2020, 13 pages.
Official Action for U.S. Appl. No. 16/086,362, dated Mar. 4, 2021, 12 pages.
Official Action for U.S. Appl. No. 16/086,362, dated Sep. 16, 2021, 14 pages.
Official Action for U.S. Appl. No. 16/086,362, dated Jan. 3, 2022, 11 pages.
Official Action for U.S. Appl. No. 16/086,362, dated Apr. 19, 2022, 13 pages.

* cited by examiner

SOLID-STATE IMAGE SENSOR, METHOD FOR PRODUCING SOLID-STATE IMAGE SENSOR, AND ELECTRONIC DEVICE

CROSS REFERENCE TO RELATED APPLICATIONS

This application is a continuation of U.S. patent application Ser. No. 16/086,362 filed 19 Sep. 2018, which is a national stage application under 35 U.S.C. 371 and claims the benefit of PCT Application No. PCT/JP2017/008404 having an international filing date of 3 Mar. 2017, which designated the United States, which PCT application claimed the benefit of Japanese Patent Application No. 2016-069624 filed 30 Mar. 2016, the entire disclosures of each of which are incorporated herein by reference.

TECHNICAL FIELD

The present technology relates to a solid-state image sensor, a method for producing a solid-state image sensor, and an electronic device. More particularly, the present technology relates to a technology of the solid-state image sensor which includes a plurality of semiconductor chips bonded together.

BACKGROUND ART

The recent increasing popularization of digital cameras has stimulated an active demand for the solid-state image sensor as the key part of the digital camera. The solid-state image sensor is technically improving in performance to meet requirements for high image quality and multiple functionality.

Similarly, there is an increasing spread of portable terminals, such as cellular phones, PDA (Personal Digital Assistant), note PC (Personal Computer), and note tablets, which have the imaging function. This has provoked people to make such portable terminals easier to carry by size reduction, weight reduction, and thickness reduction of the solid-state image sensor and components thereof. Another effort is being made to spread such portable terminals by cost reduction for the solid-state image sensor and components thereof.

In general, for example, the solid-state image sensor like CMOS (Complementary Metal Oxide Semiconductor) image sensor includes a silicon substrate and such components as photoelectric converters, amplifier circuits, and multilayered wiring layers, which are formed on the receiving surface of the silicon substrate. These components are covered with color filters and on-chip microlenses, and the receiving surface has a cover glass bonded thereto with a spacer. Opposite the receiving surface are formed terminals.

The foregoing solid-state image sensor has a signal processing circuit connected thereto which performs a prescribed process on the signals to be output. There is an increasing demand on processes to be performed by the signal processing circuit as a result of the solid-state image sensor having diversified functions.

Various attempts have been made to miniaturize the image sensor including a plurality of semiconductor chips connected together. For example, one of them is based on the SiP (System in Package) technology which is designed to seal a plurality of semiconductor chips in one package. This technology makes it possible to reduce the mounting area, thereby miniaturizing the entire structure. However, the SiP technology has a disadvantage that the wiring to connect the semiconductor chips together results in an extended transmission distance, which would be detrimental to high-speed operation.

In the meantime, there is disclosed in PTL 1, for example, a solid-state image sensor which includes a first semiconductor substrate having the pixel region (pixel array) and a second semiconductor substrate having the logic circuit, which are bonded together. This constitution permits high-speed signal transmission. The solid-state image sensor is produced by sticking to each other a first semiconductor chip and a second semiconductor chip, both in half-finished state, with the former having the pixel array and the latter having the logic circuit, and subsequently connecting the pixel array to the logic circuit, after the first semiconductor chip has been thinned down. This connection is made with three interconnections, with the first one being conductors connected to the wiring of the first semiconductor chip, the second one being the through-type conductors which penetrate the first semiconductor chip and connect to the wiring of the second semiconductor chip, and the third one being the connecting wiring which connects the two interconnections to each other. The foregoing step for connection is followed by the step of making the two semiconductor chips into one complete semiconductor chip, which functions as a solid-state image sensor of a back-illuminated type.

Moreover, there has been proposed in PTL 2 an idea for improvement over the foregoing solid-state image sensor which includes the first and second semiconductor chips bonded together. According to this idea, in the solid-state image sensor, the two semiconductor chips are not electrically connected through the through-type conductor but connected through the copper (Cu) electrodes protruding from the surfaces of the two semiconductor chips as a new technology.

In addition, there is disclosed in PTL 3 another solid-state image sensor which employs the copper (Cu) electrode as the light-shielding layer. This light-shielding layer shuts out light emanating from the hot carriers of the transistors in the logic circuit, thereby suppressing the light incidence on the pixel array side. The disclosure claims that the semiconductor chip completed after bonding has a reduced thickness as a whole.

CITATION LIST

Patent Literature

[PTL 1]
  JP 2012-64709A
[PTL 2]
  JP 2013-73988A
[PTL 3]
  JP 2012-164870A

SUMMARY

Technical Problems

The idea disclosed in PTL 3 mentioned above has a disadvantage that the copper electrode to be used as the light-shielding layer has to have a coverage (or areal ratio) equal to or larger than a certain limit.

However, any attempt to meet the requirement for increasing the areal ratio equal to or larger than a certain limit ends up with the formation of voids or regions where incomplete bonding occurs between the first and second semiconductor wafers. In addition, such voids lack bond strength, which brings about peeling in the step (following wafer bonding) of thinning the silicon substrate of the first semiconductor wafer.

It is presumed that the unbonded region occurs because the Bonding-Wave speed becomes uneven at the time of Wafer-To-Wafer Bonding as the result of increasing the areal ratio of the copper electrode. This gives rise to regions (or voids) where bonding takes place relatively slow in the peripheral part of the wafer.

The present technology was completed in view of the foregoing. Thus, it is an object of the present technology to provide a solid-state image sensor in which two or more semiconductor chips are bonded together without voids occurring in their bonding surfaces despite the conductive films bonded together at a high areal ratio.

Solution to Problems

Thus, the present technology discloses a solid-state image sensor which includes at least a first semiconductor chip carrying thereon one or more than one of a first conductor and a pixel array, and a second semiconductor chip which bonds to the first semiconductor chip and carries thereon one or more than one of a second conductor and a logic circuit, in which the first semiconductor chip and the second semiconductor chip are bonded together in such a way that the first conductor and the second conductor overlap with each other and are electrically connected to each other, and the bonding occurs such that the first conductor and the second conductor differ from each other in area of their bonding surfaces.

The present technology also discloses a method for producing a solid-state image sensor, the method including a step of preparing a first semiconductor chip which has a first conductor and a pixel array formed thereon in singular or plural number, a step of preparing a second semiconductor chip which has a second conductor and a logic circuit formed thereon in singular or plural number, and a step of placing the first conductor formed on the first semiconductor chip and the second conductor formed on the second semiconductor chip one over the other for electrical connection, in which the first semiconductor chip and the second semiconductor chip are bonded to each other in such a way that the first conductor and the second conductor differ from each other in area of their bonding surfaces.

The present technology further discloses an electronic device which includes a solid-state image sensor including at least a first semiconductor chip carrying thereon one or more than one of a first conductor and a pixel array, and a second semiconductor chip which bonds to the first semiconductor chip and carries thereon one or more than one of a second conductor and a logic circuit; the first semiconductor chip and the second semiconductor chip being bonded together in such a way that the first conductor and the second conductor overlap with each other and are electrically connected to each other; the bonding occurring such that the first conductor and the second conductor differ from each other in area of their bonding surfaces.

Advantageous Effect of Invention

The solid-state image sensor disclosed herein includes two or more semiconductor chips which are bonded together in such a way that their conductive films are bonded to each other with a high areal ratio in the bonding surface. The wafer bonding in this manner suppresses the void occurrence. The effect of the present technology is not restricted to the effect mentioned above; the effect may be variously modified as described hereinafter.

DESCRIPTION OF EMBODIMENTS

Figure 1:
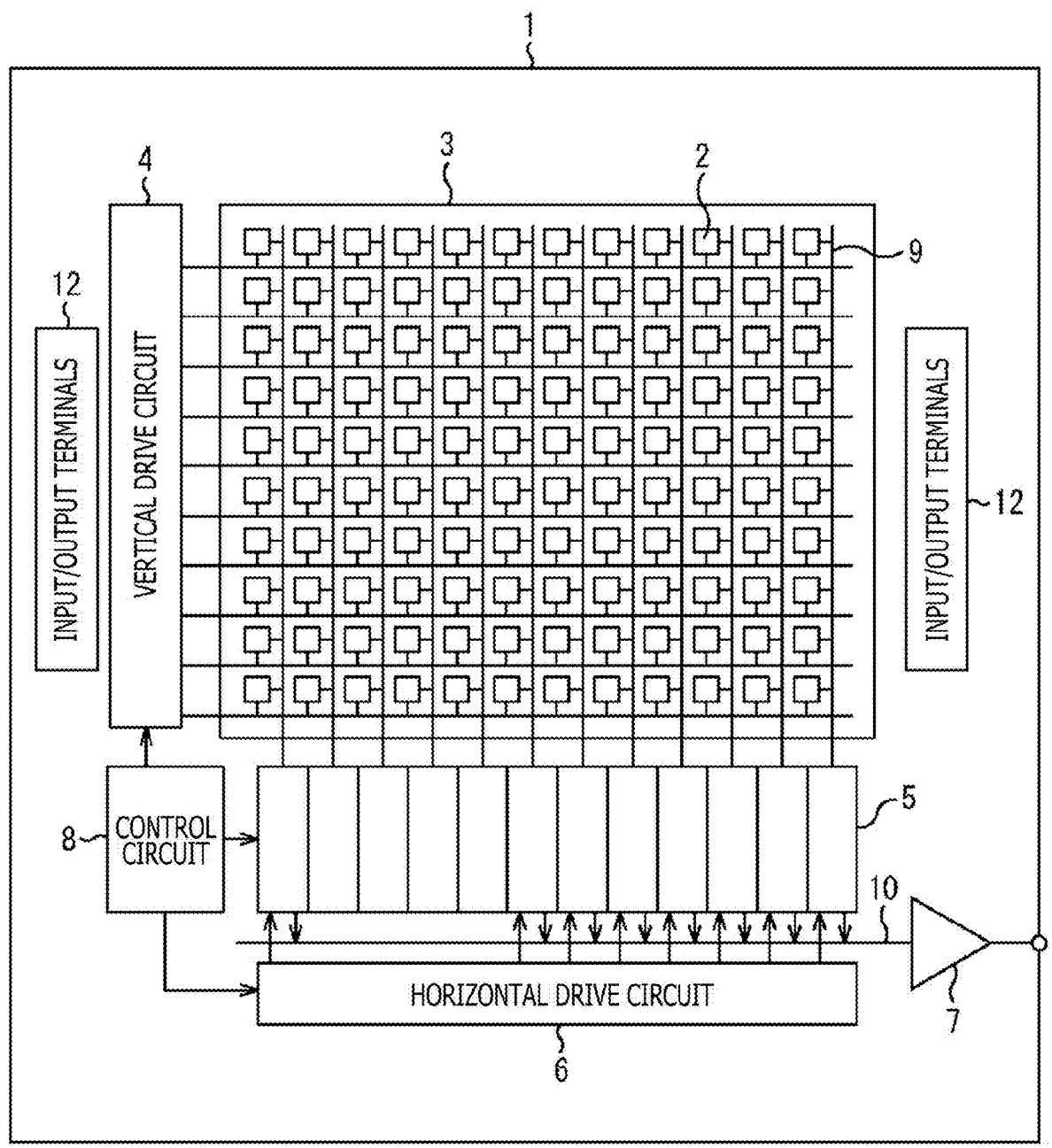
FIG. 1 is a block diagram depicting an example of constitution of a solid-state image sensor pertaining to the present technology.

The best modes for carrying out the present technology will be described below with reference to the accompanying drawings. Incidentally, the embodiments explained below are typical embodiments and are not intended to restrict the scope of the present technology. The description proceeds in the following order.

1. Example of constitution of solid-state image sensor
2. Example of laminate structure of solid-state image sensor
3. Solid-state image sensor according to first embodiment
4. Solid-state image sensor according to second embodiment
5. Solid-state image sensor according to third embodiment
6. Solid-state image sensor according to fourth embodiment
7. Solid-state image sensor according to fifth embodiment
8. Electronic device according to sixth embodiment <1. Example of Constitution of Solid-State Image Sensor>

FIG. 1 is a block diagram depicting the example of the constitution of the solid-state image sensor pertaining to the present technology.

As depicted in FIG. 1, for example, a solid-state image senor 1 is constructed as a CMOS (Complementary Metal Oxide Semiconductor) image sensor. The solid-state image senor 1 includes a semiconductor substrate, for example, Si substrate (not depicted), a pixel region (pixel array) 3 on which a plurality of pixels 2 are regularly arranged to form the two-dimensional array, and a peripheral circuit.

The pixel 2 has a photoelectric converter (for example, photodiode) and a plurality of pixel transistors (MOS transistors). The pixel transistor may include three transistors (for example, a transfer transistor, a reset transistor, and an amplifying transistor). The pixel transistor may also include four transistors (including an additional selective transistor). Incidentally, the unit pixel has a similar equivalent circuit to the well-known equivalent circuit and hence its detailed description is omitted.

In addition, the pixel 2 may be a single unit pixel or that of shared pixel structure. The latter includes a plurality of photodiodes and shared transistors except transfer transistors and floating diffusion. In other words, in the case of pixel of shared structure, the plurality of unit pixels include a photodiode and a transfer transistor sharing each of other pixel transistors.

The peripheral circuit includes a vertical drive circuit 4, a column signal processing circuit 5, a horizontal drive circuit 6, an output circuit 7, and a control circuit 8.

The vertical drive circuit 4 includes shift resisters, for example. The vertical drive circuit 4 selects the pixel drive wires and supplies the pixel drive wires with pulses to drive the pixels, thereby driving the pixels in the units of column. In other words, the vertical drive circuit 4 performs selective scans sequentially in the vertical direction in the units of pixel 2 of the pixel array 3. The vertical drive circuit 4 also supplies the column signal processing circuit 5 through vertical signal lines 9 with the pixel signals based on the signal charges which have been generated by the photoelectric converter in response to the amount of light received by the photoelectric converter of each pixel 2.

The column signal processing circuit 5 is arranged for each column of the pixels 2, for example. The column signal processing circuit 5 performs signal processing, such as noise removal, for each column of pixels on the signals output from the pixels 2 constituting one row. Specifically, the column signal processing circuit 5 performs signal processing such as CDS (Correlated Double Sampling) to remove fixed pattern noise inherent in the pixels 2, signal amplification, and A/D (Analog/Digital) conversion. The column signal processing circuit 5 also has the output stage which connects to a horizontal signal line 10 through a horizontal selection switch (not depicted).

The horizontal drive circuit 6 includes shift registers, for example. The horizontal drive circuit 6 sequentially outputs horizontal scanning pulses, thereby selecting the column signal processing circuits 5 in order, and causes the column signal processing circuits 5 to output pixel signals to the horizontal signal line 10.

The output circuit 7 performs signal processing on signals which are sequentially supplied through the horizontal signal line 10 from each of the column signal processing circuits 5, and finally outputs the results of processing. The output circuit 7 sometimes performs buffering only or sometimes performs black level adjustment, correction of variation in columns, and digital signal processing, for example.

The control circuit 8 accepts input clock and data to instruct the operational mode and outputs such data as information inside the solid-state image sensor 1. The control circuit 8 also generates the clock signal and control signal, according to the vertical sync signals, horizontal sync signals, and master clock, as the reference for operation of the vertical drive circuit 4, the column signal processing circuit 5, and the horizontal drive circuit 6. Moreover, the control circuit 8 inputs these signals into the vertical drive circuit 4, the column signal processing circuit 5, and the horizontal drive circuit 6.

Input/output terminals 12 exchange signals with the outside.

<2. Example of Laminate Structure of Solid-State Image Sensor>

Figure 2A:
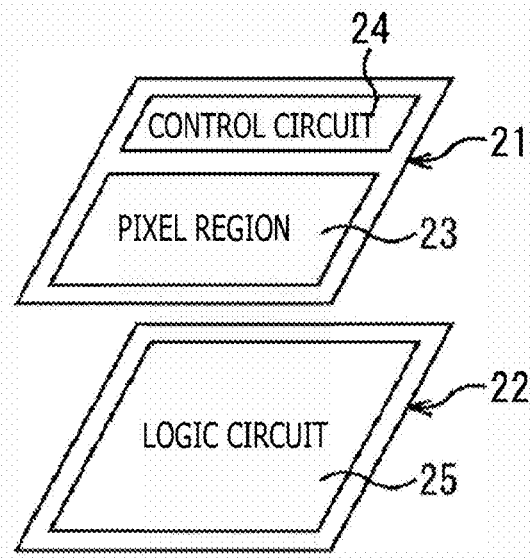
FIG. 2A is a schematic diagram depicting a laminate structure of the solid-state image sensor pertaining to the present technology.
Figure 2B:
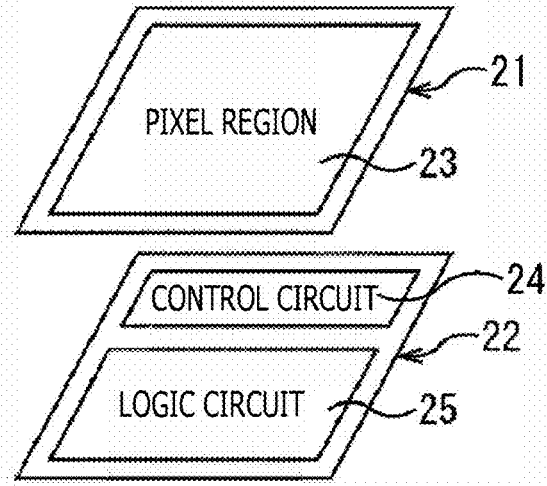
FIG. 2B is a schematic diagram depicting the laminate structure of the solid-state image sensor pertaining to the present technology.
Figure 2C:
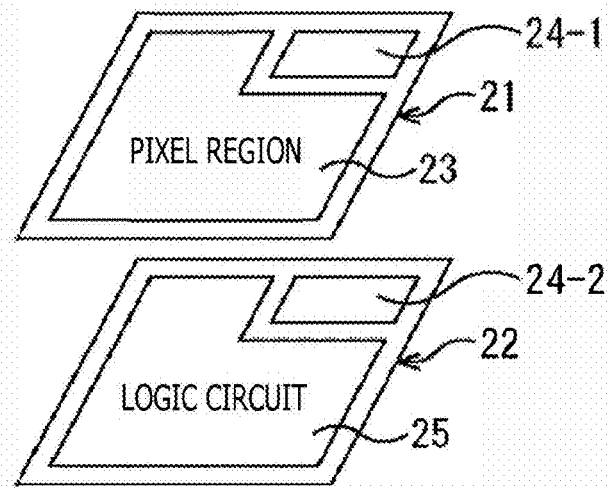
FIG. 2C is a schematic diagram depicting the laminate structure of the solid-state image sensor pertaining to the present technology.

FIGS. 2A, 2B, and 2C are schematic diagrams depicting the laminate structure of the solid-state image sensor pertaining to the present technology. They will be referenced to describe the laminate structure of the solid-state image sensor pertaining to the present technology.

A solid-state image sensor 1a as the first example is depicted in FIG. 2A. The solid-state image sensor 1a includes a first semiconductor substrate 21 and a second semiconductor substrate 22. The first semiconductor substrate 21 carries thereon a pixel array 23 and a control circuit 24, and the second semiconductor substrate 22 carries thereon a logic circuit 25 including a signal processing circuit. The first semiconductor substrate 21 and the second semiconductor substrate 22 are electrically connected to each other so that they constitute the solid-state image sensor 1a in the form of a single semiconductor chip.

A solid-state image sensor 1b as the second example is depicted in FIG. 2B. The solid-state image sensor 1b includes a first semiconductor substrate 21 and a second semiconductor substrate 22. The first semiconductor substrate 21 carries thereon a pixel array 23, and the second semiconductor substrate 22 carries thereon a control circuit 24 and a logic circuit 25 including a signal processing circuit. The first semiconductor substrate 21 and the second semiconductor substrate 22 are electrically connected to each other so that they constitute the solid-state image sensor 1b in the form of a single semiconductor chip.

A solid-state image sensor 1c as the third example is depicted in FIG. 2C. The solid-state image sensor 1c includes a first semiconductor substrate 21 and a second semiconductor substrate 22. The first semiconductor substrate 21 carries thereon a pixel array 23 and a control circuit 24-1 to control the pixel array 23, and the second semiconductor substrate 22 carries thereon a logic circuit 25 including a signal processing circuit and a control circuit 24-2 to control the logic circuit 25. The first semiconductor substrate 21 and the second semiconductor substrate 22 are electrically connected to each other so that they constitute the solid-state image sensor 1c in the form of a single semiconductor chip.

A CMOS solid-state image sensor may also include two or more semiconductor chips bonded together, although this is not depicted. For example, the CMOS solid-state image sensor in the form of a single chip may be formed by supplementing the foregoing first and second semiconductor chips with another semiconductor chip carrying thereon a memory element array, still another semiconductor chip carrying thereon additional circuit elements, or the like. In other words, the resulting CMOS solid-state image sensor includes three or more semiconductor chips bonded together.

<3. Solid-State Image Sensor According to First Embodiment>
[Constitution of Solid-State Image Sensor]

Figure 3:
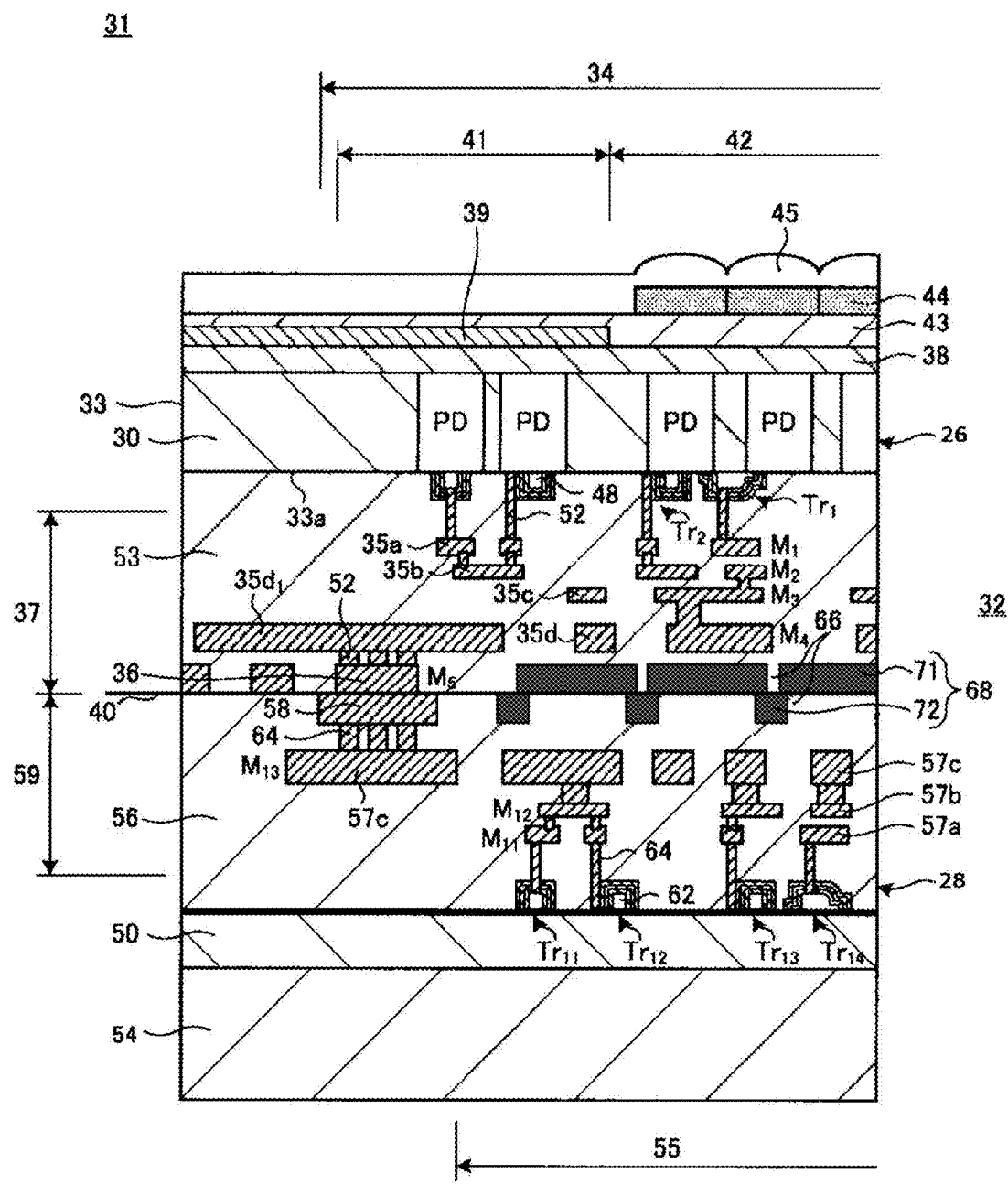
FIG. 3 is a schematic diagram depicting important parts of a solid-state image sensor according to a first embodiment of the present technology.

There is depicted in FIG. 3 the solid-state image sensor according to the present technology, or the CMOS solid-state image sensor of a back-illuminated type according to a first embodiment. The CMOS solid-state image sensor of the back-illuminated type is superior to that of a front-illuminated type in sensitivity and noise level because it has the light receiver arranged on the circuit. The solid-state image sensor 31 according to the first embodiment is similar to the solid-state image sensor 1a depicted in FIG. 2A in that it is based on a laminated semiconductor chip 32 which includes a first semiconductor chip 26 (including the pixel array 23 and the control circuit 24) and a second semiconductor chip 28 (including the logic circuit 25) which are bonded together. The first and second semiconductor chips 26 and 28 are bonded together in such a way that their multilayered wiring layers face each other and their connecting wires are directly bonded to each other.

The first semiconductor chip 26 includes a first semiconductor substrate 33 of silicon which has been thinned and a pixel array 34 formed thereon. The pixel array 34 includes a plurality of pixels arranged in a two-dimensional pattern, with each pixel including a photodiode PD as a photoelectric converter and a plurality of pixel transistors Tr1 and Tr2. In addition, the semiconductor substrate 33 carries a plurality of MOS transistors constituting the control circuit 24 formed thereon, although this is not depicted. The semiconductor substrate 33 has a multilayered wiring layer 37 formed on a surface 33a thereof, with an interlayer insulating film 53 interposed between them. The multilayered wiring layer 37 includes wirings 35 (35a to 35d) and 36 of metal M1 to M5 in five layers. The wirings 35 and 36 are formed using copper (Cu) by the dual damascene method. On the back side of the semiconductor substrate 33 is formed a light-shielding film 39 (including an optical black region 41), with an insulating film 38 interposed thereunder. The semiconductor substrate 33 additionally has a color filter 44 and an on-chip lens 45 which are formed on an effective pixel array 42, with a planarized film 43 interposed thereunder. The on-chip lens 45 may also be formed on the optical black region 41.

Figure 4:
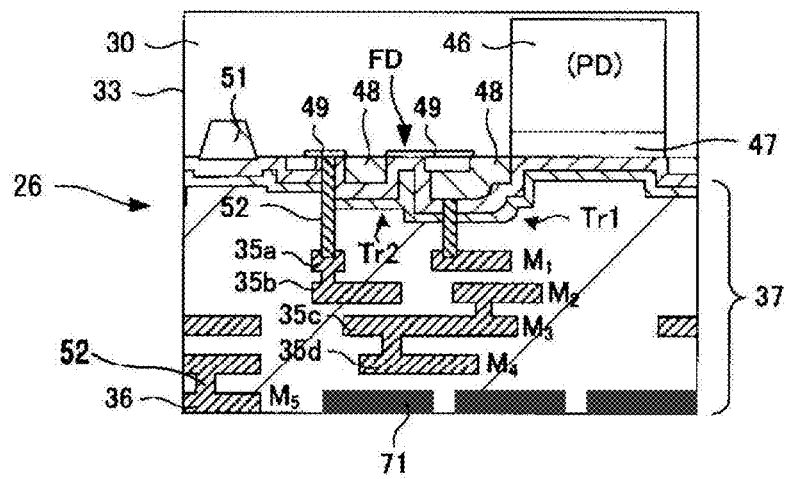
FIG. 4 is an enlarged view depicting important parts of a first semiconductor chip according to the first embodiment.

The pixel transistors Tr1 and Tr2 depicted in FIG. 3 represent a plurality of pixel transistors. FIG. 3 schematically depicts some pixels of the pixel array 34, and FIG. 4 depicts the detail of one pixel. The first semiconductor chip 26 has a photodiode PD formed in the thinned semiconductor substrate 33. The photodiode PD includes, for example, an n-type semiconductor region 46 and a P-type semiconductor region 47 close to the surface of the substrate. On the surface of the substrate carrying the pixel are formed the P-type semiconductor region 48, with a gate insulating film interposed thereunder, and the pixel transistors Tr1 and Tr2, each including a gate electrode 48 and a paired source-drain region 49. The pixel transistor Tr1 adjacent to the photodiode PD is equivalent to a floating diffusion FD. Individual unit pixels are separated from one another by an element separating region 51. The element separating region 51 has, for example, an STI (Shallow Trench Isolation) structure, which is formed by embedding an insulating film (such as $SiO_2$ film) in a groove formed in the substrate.

The first semiconductor chip 26 has the multilayered wiring layer 37 in which a conductive via 52 helps connection between the pixel transistor and the wiring 35 and between the adjacent upper and lower wirings 35. In addition, the connecting wiring 36 of metal M5 as the fifth layer is formed on a bonding surface 40 between the first semiconductor chip 26 and the second semiconductor chip 28. The connecting wiring 36 is connected to the wiring 35d of metal M4 as the fourth layer through the conductive via 52.

Figure 5:
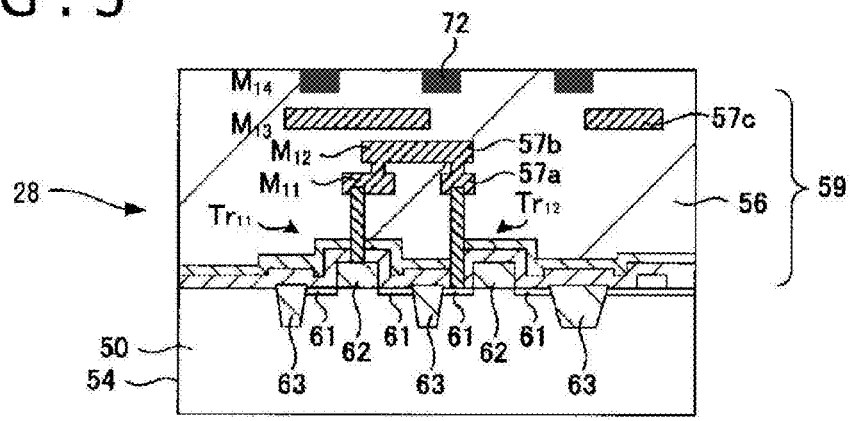
FIG. 5 is an enlarged view depicting important parts of a second semiconductor chip according to the first embodiment.

The second semiconductor chip 28 has a logic circuit 55 constituting the peripheral circuit formed in the region which functions as the semiconductor chip in a second semiconductor substrate 54 of silicon. The logic circuit 55 includes a plurality of MOS transistors Tr11 to Tr14 including CMOS transistors. The second semiconductor substrate 54 (depicted in FIG. 5) has in that portion close to the surface thereof a multilayered wiring layer 59 including wirings 57 [57a to 57c] and 58 of metal M11 to M14 in four layers in this example, with an interlayer insulating film 56 interposed thereunder. The wirings 57 and 58 are formed using copper (Cu) by the dual damascene method.

In FIG. 3, the MOS transistors in the logic circuit 55 are represented by the MOS transistors Tr11 to Tr14. Although the MOS transistors Tr11 to Tr14 are schematically depicted in FIG. 3, the detailed structure of the MOS transistors Tr11 and Tr12 is, for example, depicted in FIG. 5. The second semiconductor chip 28 has the MOS transistors Tr11 and Tr12 formed in the semiconductor well region on the surface of the second semiconductor substrate 54, such that each transistor includes a paired source-drain region 61 and a gate electrode 62, with a gate insulating film interposed between them. The MOS transistors Tr11 and Tr12 are separated from each other by an element separating region 63 of the STI structure, for example.

The second semiconductor chip 28 has the multilayered wiring layers 59 in which a conductive via 64 makes a connection between each of the MOS transistors Tr11 to Tr14 and each of the wirings 57 and between each of the adjacent upper and lower layers and each of the wirings 57. It also has the connecting wiring 58 of metal M14 as the fourth layer, which faces the bonding surface 40 between the first semiconductor chip 26 and the second semiconductor chip 28. The connecting wiring 58 is connected to the appropriate wiring 57c of metal M13 as the third layer through the conductive via 64.

The first semiconductor chip 26 and the second semiconductor chip 28 are electrically connected together in such a way that their multilayered wiring layers 37 and 59 face each other and the connecting wirings 36 and 58 (which face the bonding surface 40) are bonded together directly. An interlayer insulating film 66 near the bonding part includes two insulating films combined together, one being an insulating film capable of blocking the copper diffusion from the copper wiring and the other being an insulating film incapable of blocking the copper diffusion from the copper wiring. The fabrication method will be given later. The connecting wirings 36 and 58 are bonded together directly through the copper wiring by the heat diffusion method. The interlayer insulating films 66 (except for the connecting wirings 36 and 58) are bonded together by means of plasma or adhesive.

In addition to the direct bonding between the connecting wirings 36 and 58 that face the bonding surface 40, there is another way of bonding by means of plasma after forming an extremely thin uniform insulating thin film 900 on the surface of the multilayered wiring layers 37 and 59. Incidentally, the insulating thin film 900 is not depicted in FIG. 3.

Figure 6:
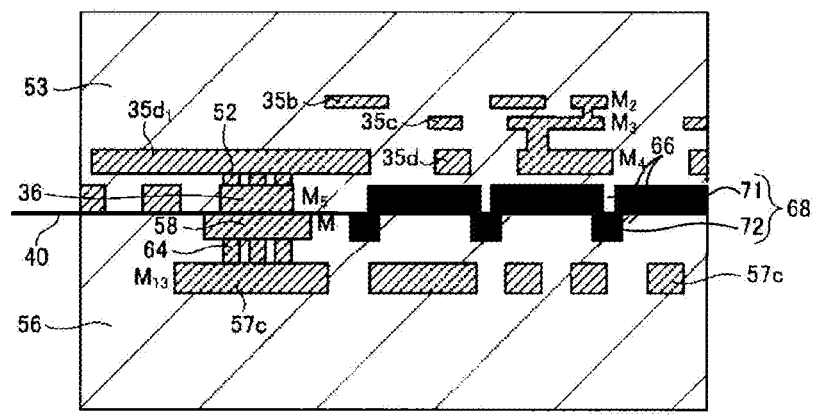
FIG. 6 is an enlarged view depicting important parts of a bonding part according to the first embodiment.

Moreover, according to the present embodiment, the first semiconductor chip 26 and the second semiconductor chip 28 are bonded together, with a light-shielding layer 68 inserted between them, which is a conductive film of the same kind as the connecting wiring, as depicted in FIGS. 3 and 6 (which are enlarged views of important parts). In other words, according to the present embodiment, the light-shielding layer 68 includes a first conductive material 71 and a second conductive material 72, with the former functioning as a light-shielding part including metal M5 which is identical with the connecting wiring 36 in the first semiconductor chip 26, and the latter functioning as a light-shielding part including metal M14 which is identical with the connecting wiring 58 in the second semiconductor chip 28.

Figure 7A:
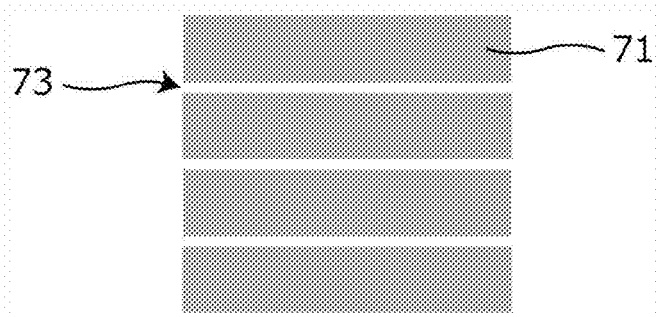
FIG. 7A is a diagram depicting a structure of a light-shielding part according to the first embodiment.
Figure 7B:
FIG. 7B is a diagram depicting the structure of the light-shielding part according to the first embodiment.
Figure 7C:
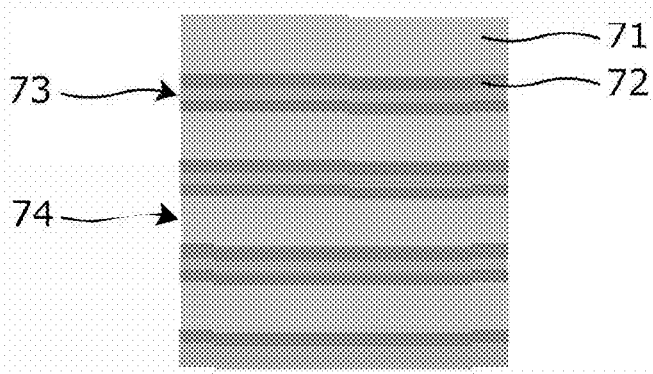
FIG. 7C is a diagram depicting the structure of the light-shielding part according to the first embodiment.

The solid-state image sensor according to the present embodiment has the light-shielding part constructed as depicted in FIGS. 7A to 7C. The light-shielding part 71 according to the present embodiment depicted in FIG. 7A (top view) includes stripes arranged in the horizontal direction and separated by openings 73 at a certain pitch. Although the light-shielding part 71 is wider than the opening 73 according to the present embodiment, the opening 73 may be wider than the light-shielding part 71.

The light-shielding parts 72 according to the present embodiment depicted in FIG. 7B are arranged horizontally in a stripy pattern at a certain pitch so that they are separated by openings 74. According to the present embodiment, the light-shielding parts 72, which are narrower than the opening 73, are so arranged as to cover the openings 73 for the light-shielding part 71.

The light-shielding layer 68 which is formed after the light-shielding parts 71 and 72 have been bonded together is depicted in FIG. 7C (top view). It is noted that the light-shielding parts 71 and 72 overlap one another to close the openings. In other words, the region in which the first conductor of the light-shielding part 71 and the second conductor of the light-shielding part 72 are formed is equal to or larger than the region in which the pixel array 23 is formed. Incidentally, according to the present embodiment, the light-shielding part 71 is wider than the light-shielding part 72, but the light-shielding part 72 may be wider than the light-shielding part 71. The region of the bonding surface 40 in which the conductors of the light-shielding parts 71 and 72 are formed may partly have openings.

The light-shielding part 71 and the light-shielding part 72 which covers the opening 73 between the adjacent light-shielding parts 71 are formed such that they partly overlap. The light-shielding parts 71 and 72 are directly bonded together at their overlapping region when the connecting wirings 36 and 58 are directly bonded together. One of the light-shielding parts 71 and 72 constitutes the wiring having the opening 73 and the other covers the opening 73 (or it has a larger area than the opening 73) and is so formed as to partly overlap. The opening 73 may take on any other shape than the horizontal strip depicted in FIG. 7A.

The light-shielding layer 68 should preferably be kept potentially stable with a fixed grounding voltage, for example. This can be achieved by voltage application to the first semiconductor substrate 33 or the second semiconductor substrate 54 or both.

[Method for Producing Solid-State Image Sensor]

Figure 8:
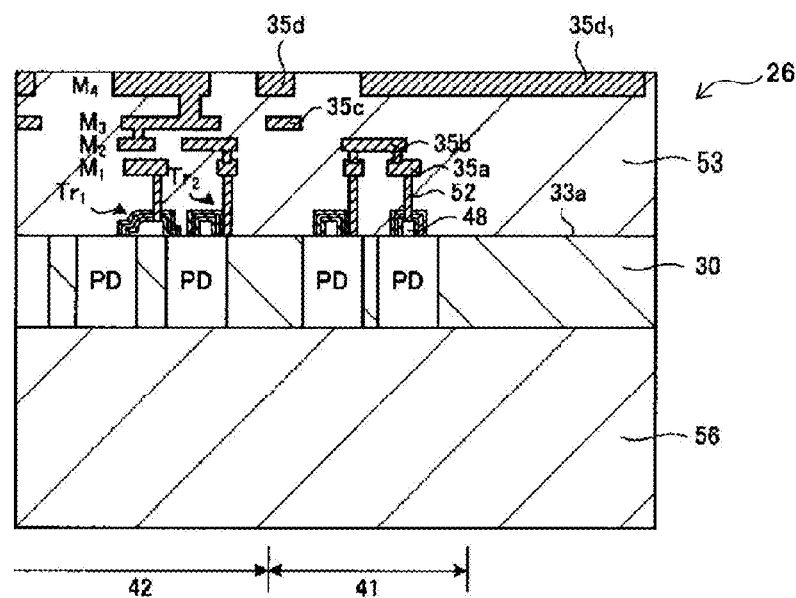
FIG. 8 is a diagram depicting an example of the process for producing the solid-state image sensor according to the first embodiment (Part 1).
Figure 9:
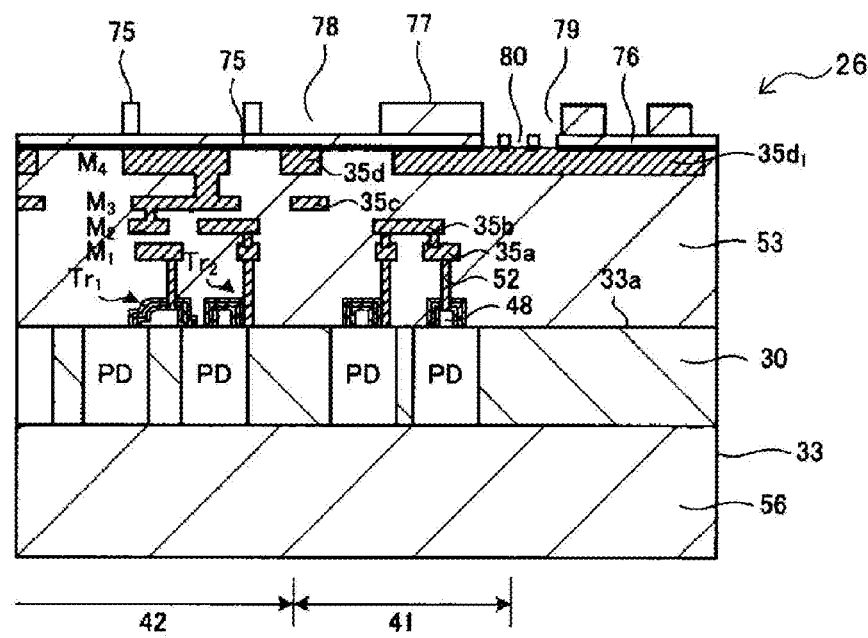
FIG. 9 is a diagram depicting an example of the process for producing the solid-state image sensor according to the first embodiment (Part 2).
Figure 10:
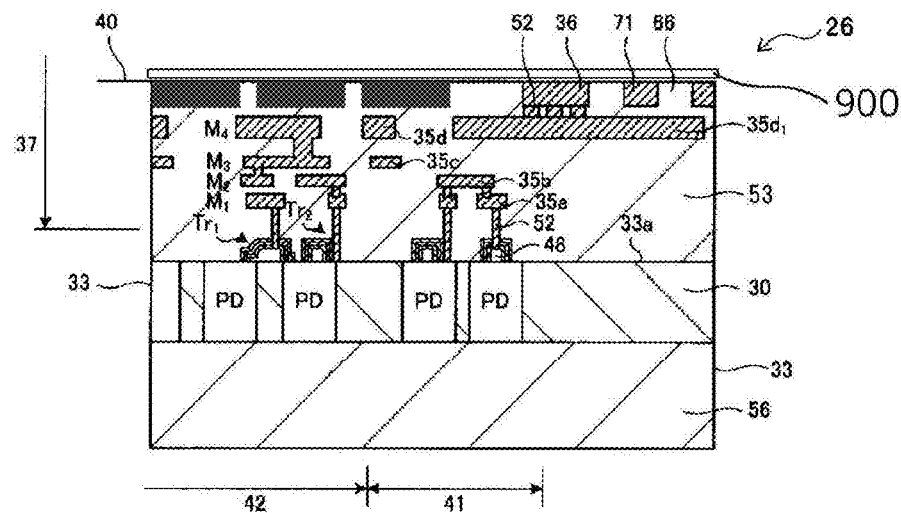
FIG. 10 is a diagram depicting an example of the process for producing the solid-state image sensor according to the first embodiment (Part 3).
Figure 11:
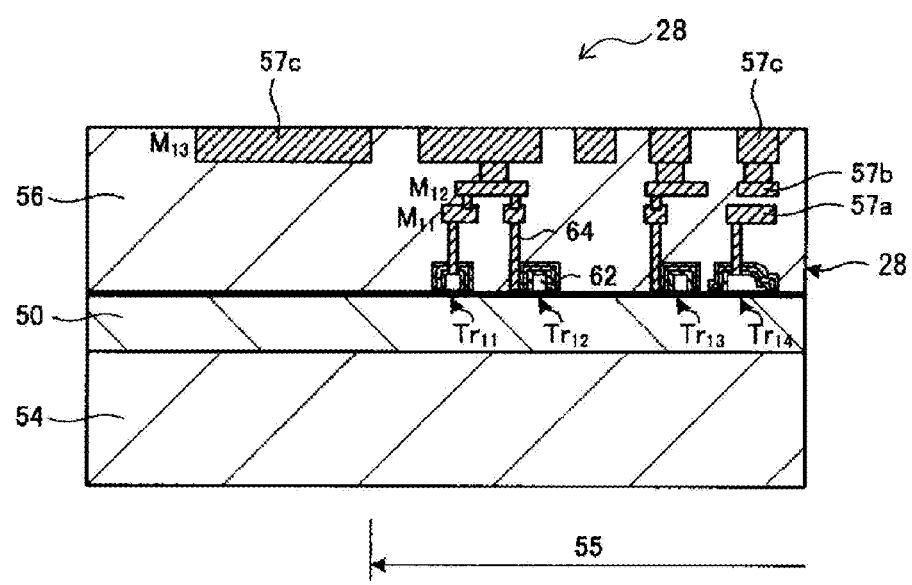
FIG. 11 is a diagram depicting an example of the process for producing the solid-state image sensor according to the first embodiment (Part 4).
Figure 12:
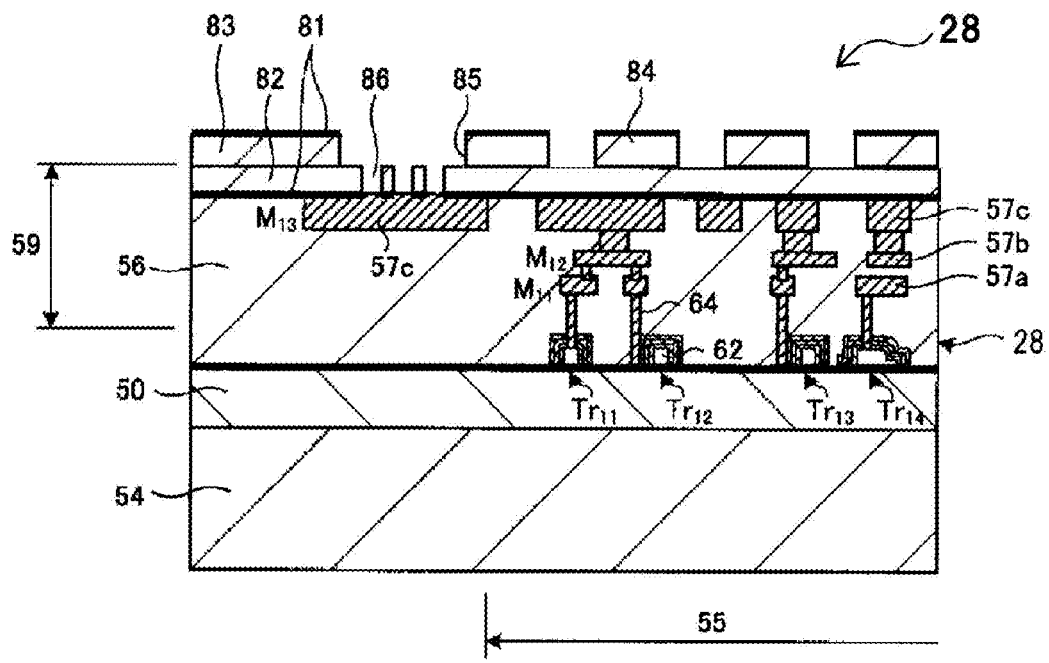
FIG. 12 is a diagram depicting an example of the process for producing the solid-state image sensor according to the first embodiment (Part 5).
Figure 13:
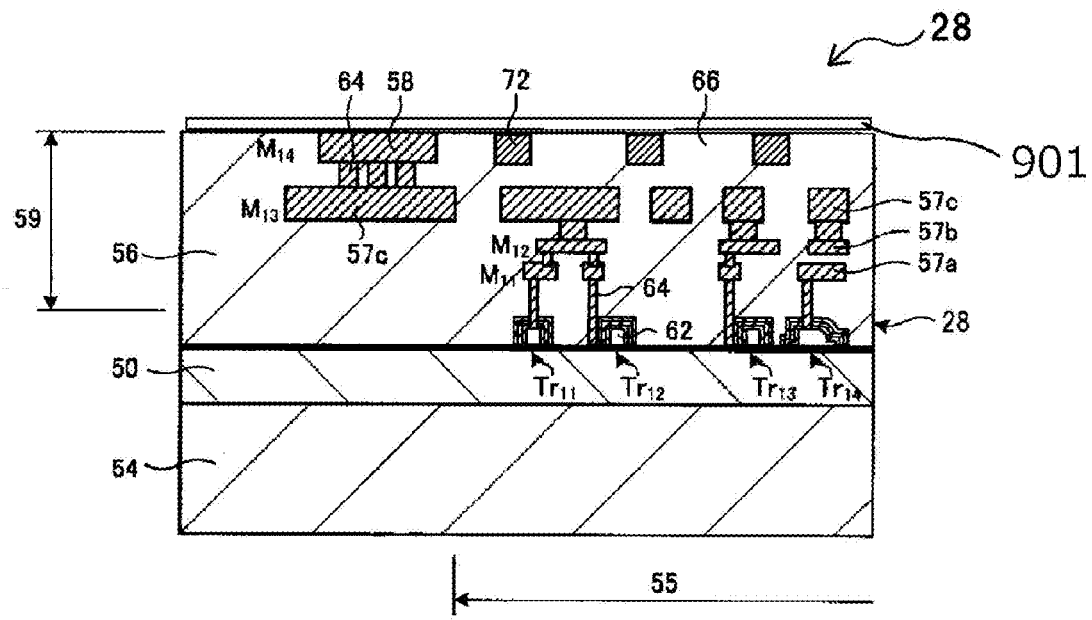
FIG. 13 is a diagram depicting an example of the process for producing the solid-state image sensor according to the first embodiment (Part 6).
Figure 14:
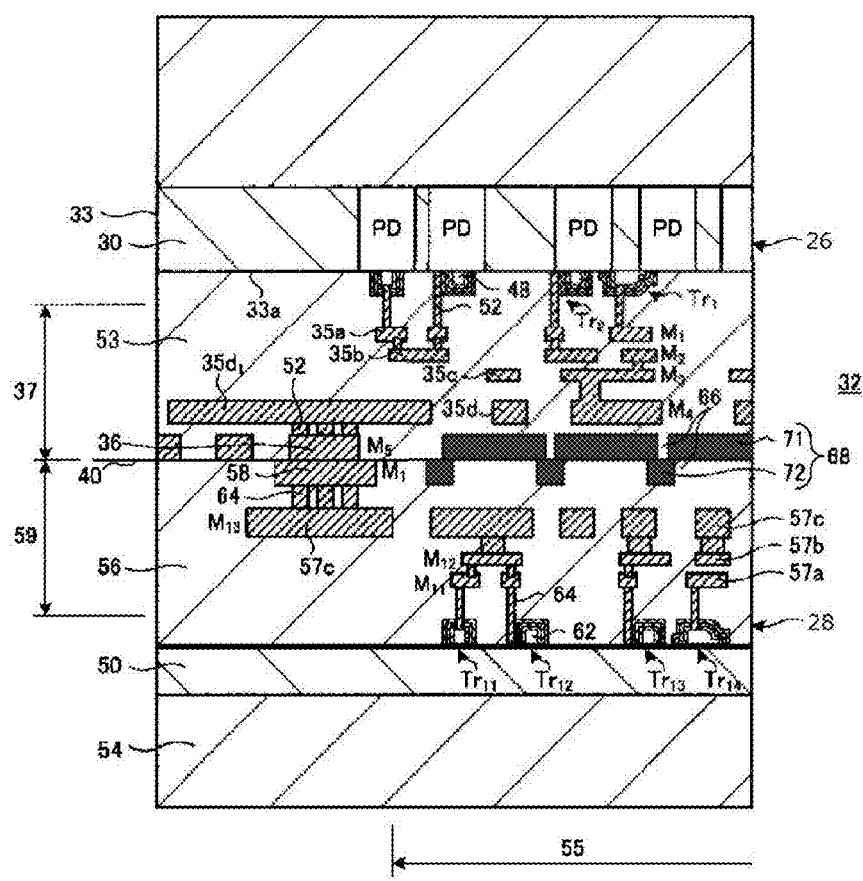
FIG. 14 is a diagram depicting an example of the process for producing the solid-state image sensor according to the first embodiment (Part 7).
Figure 15:
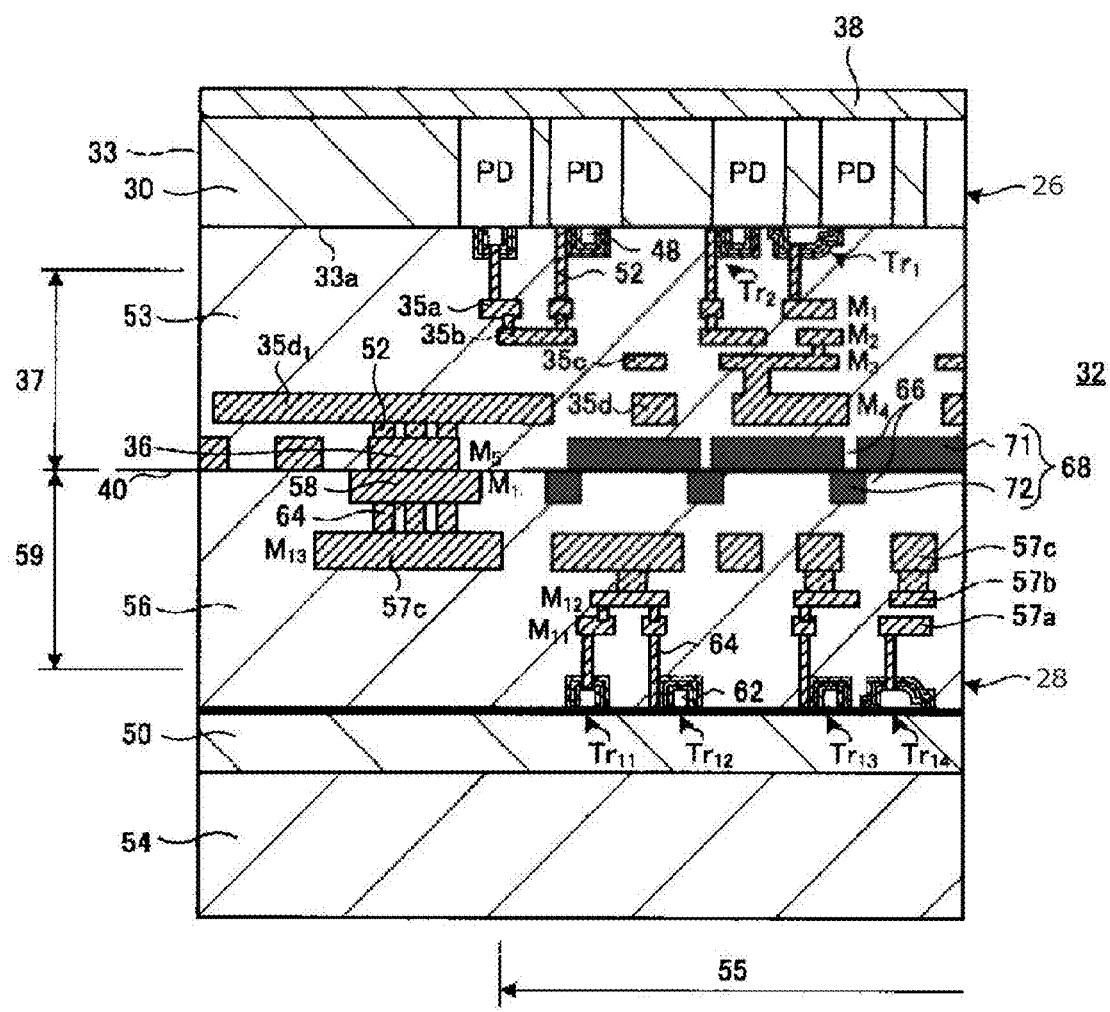
FIG. 15 is a diagram depicting an example of the process for producing the solid-state image sensor according to the first embodiment (Part 8).
Figure 16:
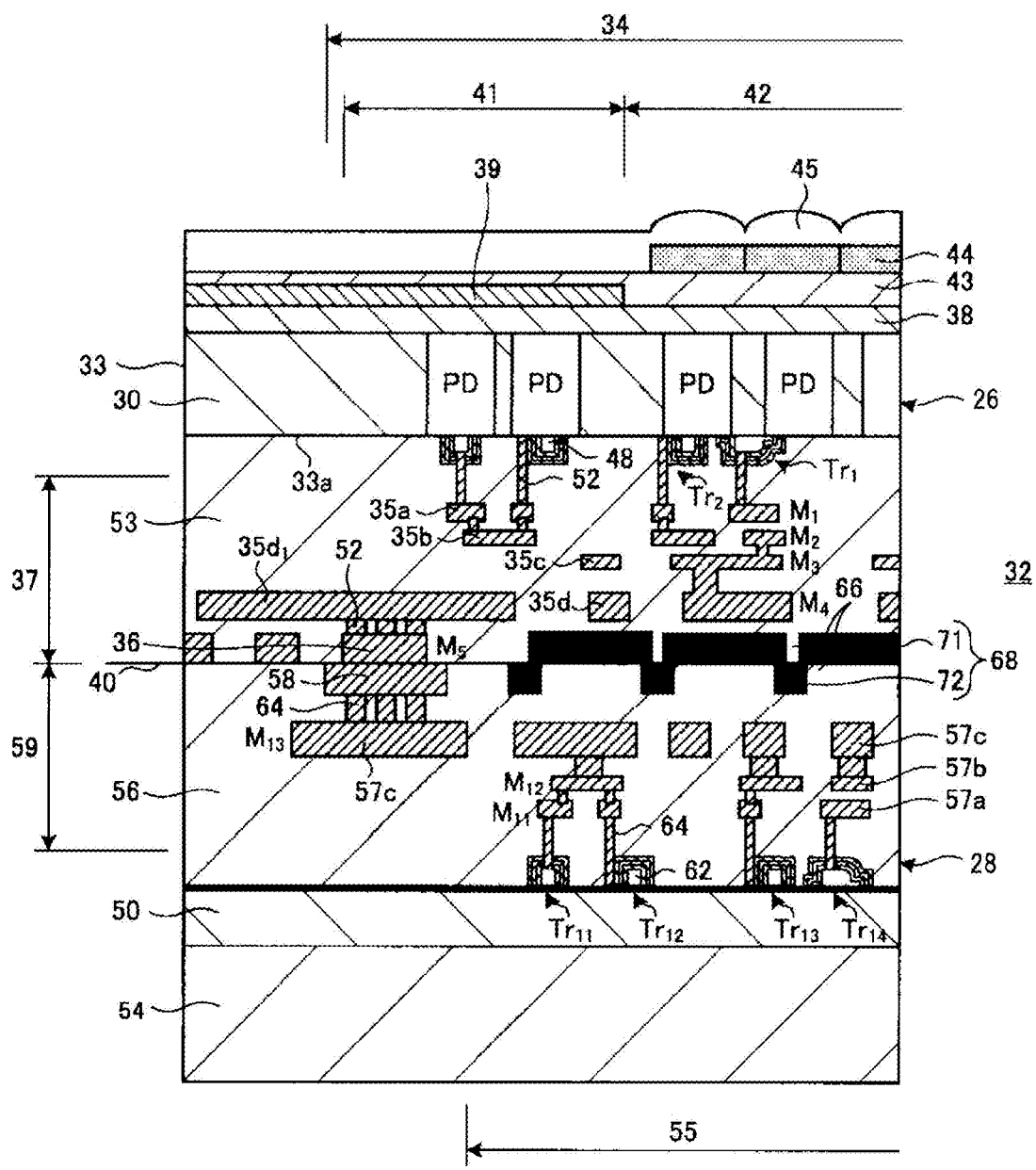
FIG. 16 is a diagram depicting an example of the process for producing the solid-state image sensor according to the first embodiment (Part 9).

The solid-state image sensor 31 according to the first embodiment is produced by the method illustrated in FIGS. 8 to 16. FIGS. 8 to 10 depict the processes of producing the first semiconductor chip having the pixel array. FIGS. 11 to 13 depict the processes of producing the second semiconductor chip having the logic circuit. FIGS. 14 to 16 depict the processes that follow the process for bonding.

As depicted in FIG. 8, the process starts with fabricating the first semiconductor wafer 33 of silicon, for example (to be referred to as a semiconductor substrate hereinafter) so as to form a semiconductor well region 30, which will be covered by each semiconductor chip later. Next, the semiconductor well region 30 is given the photodiodes PD which function as the photoelectric converter for each pixel. Incidentally, the element separating region 51 (depicted in FIG. 4) may be formed beforehand (not depicted in FIG. 8). The photodiodes PD are so formed as to extend in the depth direction of the semiconductor well region 30. The photodiodes PD are formed in the effective pixel array 42 and the optical black region 41, which all together constitute the pixel array 34.

In the next process, the semiconductor well region 30 has its surface 33a fabricated so that a plurality of pixel transistors, which constitute each pixel, are formed thereon. The pixel transistor includes, for example, transfer transistor, reset transistor, amplifying transistor, and selective transistor. Here, they are represented by the pixel transistors Tr1 and Tr2 as mentioned above. Each of the pixel transistors Tr1 and Tr2 includes the paired source-drain region and the gate electrode, with the gate insulating film interposed thereunder.

The semiconductor substrate 33 has its upper surface 33a provided with a plurality of wiring layers together with the conductive via 52 through the interlayer insulating film 53. In this embodiment, the wiring layers include the wirings 35 [35a, 35b, 35c, 35d] of metal M1 to M4 in four layers in this example. The wiring 35 may be formed by the dual damascene method. The foregoing process includes forming the connecting hole and wiring groove simultaneously in the interlayer insulating film 53 by the via first method, forming the metal film capable of blocking copper diffusion and the copper seed film, and embedding the copper layer by the plating method. The metal film capable of blocking copper diffusion may be formed using any one of Ta, TaN, Ti, TiN, W, WN, Ru, TiZrN, or alloy thereof, for example. The foregoing process is followed by CMP (Chemical Mechanical Polishing) to remove excess copper layer and form the copper wiring integral with the planarized conductive via. Subsequently, an insulating film capable of blocking copper diffusion is formed (not depicted). The insulating film capable of blocking copper diffusion may be formed using any one of SiN, SiC, siCN, SiON, etc. The foregoing processes are repeated to form the wirings 35a to 35d of metal M1 to M4 in four layers.

The subsequent process (depicted in FIG. 9) includes sequentially forming a first insulating film 76 incapable of blocking copper diffusion, a second insulating film 77 incapable of blocking copper diffusion, and an insulating film 75 capable of blocking copper diffusion. The first and second insulating films 76 and 77 are formed using SiO2 film, SiCOH film, or the like. The insulating film 75 capable of blocking copper diffusion may be the similar insulating film of SiN, SiC, SiCN, SiON, or the like as mentioned above, for example. The insulating film 75 capable of blocking copper diffusion, the first insulating film 76, and the second insulating film 77 constitute part of the interlayer insulating film 53. The next process is to perform patterning on the insulating film 75 capable of blocking copper diffusion (on the uppermost surface), the second insulating film 77, and the first insulating film 76 by lithography and etching for the via first method, thereby forming a via hole 80 selectively. Then, the second insulating film 77 undergoes patterning so that an opening 78 is formed selectively. In other words, patterning is performed so as to form the opening 78 corresponding to the light-shielding part 71 (excluding the opening 73), an opening 79 corresponding to the connecting wiring 36 to be formed, and the via hole 80.

The subsequent process (depicted in FIG. 10) includes filling the openings 78 and 79 and the via hole 80 with copper by the dual damascene method (in the similar way as mentioned above), thereby forming the light-shielding part 71 having the opening 73, the conductive via 52 connecting to the wiring 35d, and the connecting wiring 36. The light-shielding part 71 and the connecting wiring 36 are formed by metal M5 as the fifth layer. This process forms the multilayered wiring layer 37 including the wirings 35a to 35d of metal M1 to M5, the connecting wiring 36, the light-shielding part 71, the interlayer insulating film 53, and the insulating films 75 to 77. In this stage, it is desirable that the wiring 35d1 of metal M4 (as the fourth layer) connecting to the connecting wiring 36 should sufficiently extend toward and overlap with the light-shielding part 71 so that the light emanating from the logic circuit does not leak to the photodiode PD.

In addition, the extremely thin uniform insulating thin film 900 is formed on the light-shielding part 71 and the connecting wiring 36.

On the other hand, the second semiconductor wafer (referred to as semiconductor substrate hereinafter) 54 of silicon, for example, has a semiconductor well region 50 formed for each of the individual semiconductor chips, as depicted in FIG. 11. The semiconductor well region 50 has the logic circuit 55 including a plurality of MOS transistors Tr11 to Tr14, which are merely representative as mentioned above. Although not depicted, the element separating region 63 (see FIG. 5) may be formed beforehand.

The semiconductor substrate 54 is given on the upper surface thereof the wirings 57 [57a, 57b, 57c] of metal M11 to M13 in three layers in this example, including the conductive via 64, which are formed through the interlayer insulating film 56. The wiring 57 may be formed by the dual damascene method as follows. First, the interlayer insulating film has the connecting hole and wiring groove formed simultaneously therein by the via first method. Then, it has the metal film capable of blocking copper diffusion and the copper seed film formed therein and it subsequently has the copper layer formed therein by plating. The metal film capable of blocking copper diffusion may be formed using any of Ta, TaN, Ti, TiN, W, WN, Ru, TiZrN, and alloy thereof, for example. This process is followed by CMP (Chemical Mechanical Polishing) to remove excess copper layer. This gives the copper wiring integral with the planarized conductive via. The subsequent process forms the insulating film capable of blocking copper diffusion (not depicted). This insulating film capable of blocking copper diffusion may be formed using any of SiN, SiC, siCN, SiON, etc. The foregoing processes are repeated to form the wirings 57a to 57c of metal M11 to M13 in three layers.

The subsequent step (depicted in FIG. 12) includes sequentially forming a first insulating film 82 incapable of blocking copper diffusion, a second insulating film 83 incapable of blocking copper diffusion, and an insulating film 81 capable of blocking copper diffusion. The first and second insulating films 82 and 83 are formed using SiO2 film, SiCOH film, or the like. The insulating film 81 capable of blocking copper diffusion may be the similar insulating film of SiN, SiC, SiCN, SiON, or the like as mentioned above, for example. The insulating film 81 capable of blocking copper diffusion, the first insulating film 82, and the second insulating film 83 constitute part of the interlayer insulating film. The next process is to perform patterning on the insulating film 81 capable of blocking copper diffusion (on the uppermost surface), the second insulating film 83, and the first insulating film 82 by lithography and etching for the via first method, thereby forming a via hole 86 selectively. Then, the second insulating film 83 undergoes patterning so that openings 84 and 85 are formed selectively. The opening 84 is formed at the position where it covers the light-shielding part 71 and the opening 73 in the first semiconductor chip. The opening 84 should preferably be so formed as to cover the opening 73 of the light-shielding part 71 and partly overlaps the light-shielding part 71 so that there will not be light leakage due to misalignment when the first and second semiconductor substrates are bonded together later. In other words, patterning is performed so that it has the opening 84 corresponding to the light-shielding part 72 to be formed, the opening 85 corresponding to the connecting wiring 58 to be formed, and the via hole 86.

The subsequent process (depicted in FIG. 13) is to form the openings 84 and 85 and fill the via hole 86 with copper by the dual damascene method, thereby forming the light-shielding part 72, the conductive via 64 connecting to the wiring 57c, and the connecting wiring 58, in the similar way as mentioned above. The light-shielding part 72 and the connecting wiring 58 are formed by metal M14 as the fourth layer. In this way there is formed the multilayered wiring layer 59 including the wirings 57a to 57c of metal M11 to M13, the connecting wiring 58, the light-shielding part 72, the interlayer insulating film 56, and the insulating films 81 to 83.

Moreover, an extremely thin uniform insulating thin film 901 is formed on the light-shielding part 72 and the connecting wiring 58.

The next process (depicted in FIG. 14) is to bond together the first semiconductor substrate 33 and the second semiconductor substrate 54 in such a way that multilayered wiring layers of the first semiconductor substrate 33 and the second semiconductor substrate 54 face each other and their connecting wirings 36 and 58 come into direct contact with each other for electrical connection. In other words, this process causes the first and second semiconductor substrates 33 and 54 to be physically bonded together and electrically connected to each other. This process also causes the light-shielding parts 71 and 72 to be directly bonded together at their overlapping parts. That is, the bonding between the connecting wirings 36 and 58 and between the light-shielding parts 71 and 72 is accomplished by the heat diffusion method, which is performed at approximately 100° C. to 500° C. The insulating films (as the interlayer insulating films) are bonded together by means of plasma (after surface treatment) or adhesive.

As mentioned above, the bonding of the first conductor of the light-shielding part 71 to the second conductor of the light-shielding part 72 is accomplished by inserting an insulating film between their bonding surfaces 40 and then applying heat to promote the crystal growth of copper as the electrical conductor. This establishes the electrical connection near the bonding surface 40. This causes the first conductor and the second conductor to be arranged nearer to the bonding surface 40 than the wiring 35 and the logic circuit 55 which are formed respectively on the first semiconductor chip 26 and the second semiconductor chip.

The next process (depicted in FIG. 15) is to grind and polish, by CMP or the like, the back side of the first semiconductor substrate 33 for thickness reduction to such an extent that there remains a necessary thickness for the photodiode PD.

The next process (depicted in FIG. 16) is to coat the surface of the thinned semiconductor substrate with the light-shielding film 39, with the insulating film 38 interposed thereunder, that covers that part of the photodiodes PD corresponding to the optical black region. Moreover, the photodiodes PD corresponding to the effective pixel array are covered with the color filters 44 and the on-chip lenses 45, with the planarized film 43 interposed thereunder.

The next process is to separate the first and second semiconductor substrates 33 and s54, which have been bonded together, into individual semiconductor chips. Thus there is obtained the solid-state image sensor 31 (depicted in FIG. 3) as desired.

It is desirable to make the light-shielding parts 71 and 72, the connecting wirings 36 and 58, and the wirings of metal M5 and M14 at the same level as them, from a material which is highly conductive, highly capable of shielding light, and easy to bond. Such a material includes not only copper but also any one of Al W, Ti, Ta, Mo, Ru, and alloy thereof.

The light-shielding layer 68 (or the light-shielding parts 71 and 72 in this example) should have an adequate thickness which is determined according to the wavelength of light emanating from the second semiconductor chip 28. The present embodiment requires the light-shielding layer 68 to block light originating from hot carriers in the MOS transistor in the second semiconductor chip 28. Consequently, the light-shielding layer should be thick enough to block light having a wavelength of approximately 1 μm. This means that the thickness of the light-shielding layer 68 (or the light-shielding parts 71 and 72) should be approximately 50 to 800 nm, for example.

The present embodiment that covers the solid-state image sensor 31 and the method for production thereof requires that the first and second semiconductor chips 26 and 28 should be bonded together in such a way that the light-shielding layer 68 and the shield layer against electrical noise are formed by only the first and second conductors 71 and 72 in the neighborhood of the bonding surface 40 between the first semiconductor chip 26 and the second semiconductor chip 28. Moreover, in the neighborhood of the bonding surface 40, the first conductor 71 and the second conductor 72 come into contact with each other in such a way that the area of the former in contact with the bonding surface 40 is larger than the area of the latter in contact with the bonding surface 40.

That is, the contact areas for the two are not equal. Consequently, according to the solid-state image sensor 31 and the method for production thereof described herein, it is possible to achieve the wafer bonding, with two layers of conductive film connecting to each other asymmetrically such that one has a larger contact area than the other. Bonding in this manner prevents voids from occurring at the bonding surface 40. Moreover, the avoidance of void occurrence leads to the solid-state image sensor 31 with improved image quality. The first and second conductors 71 and 72 may be bonded together satisfactorily so long as their areas at the bonding surface 40 are not equal. It is permissible that the second conductor 72 has a larger bonding area than the first conductor 71.

The term "asymmetrically" means that the areal ratio of copper is equal to or less than 30% for the lower substrate and equal to or more than 70% for the upper substrate, so that the resulting layout ensures 100% light shielding after bonding. The areal ratio of the higher substrate should preferably be equal to or larger than 70%, more preferably equal to or larger than 87%, and the areal ratio of the lower substrate should preferably be equal to or smaller than 30%, more preferably equal to or smaller than 13%. Incidentally, the first and second conductors 71 and 72 in the neighborhood of the bonding surface 40 may be replaced by a dummy conductor.

The present embodiment that covers the solid-state image sensor 31 and a method for production thereof requires that the first and second semiconductor chips 26 and 28 should be bonded together in such a way that the light-shielding layer 68 is formed by metal M5 and M14 in the same layer as the connecting wirings 36 and 58 near their bonding region. This light-shielding layer 68 protects the pixel array in the first semiconductor chip 26 from the light emitted by the hot carriers of the MOS transistor of the logic circuit 55 in the second semiconductor chip 28. Suppression of the adverse effect due to light emanating from hot carriers reduces dark current and random noise.

According to the present embodiment, the method for producing the solid-state image sensor 31 involves the process of forming the light-shielding layer 68 from metal M5 and M14 which are in the same layers as the connecting wirings 36 and 58. This technology offers the advantage of reducing the entire thickness of the bonded semiconductor chips and hence the solid-state image sensor 31 as a whole more than the one in the past. The result is the solid-state image sensor 31 with a low level of dark current and random noise which is realized without increase in the total thickness of the semiconductor chip.

Moreover, according to the present embodiment, the method for producing the solid-state image sensor 31 involves the step of forming the wirings, connecting wirings, and light-shielding layer at the same time. This reduces the number of producing processes and masking processes and the cost of material. The result is the low-priced solid-state image sensor with a low level of dark current and random noise.

<4. Solid-State Image Sensor According to Second Embodiment>

Figure 17:
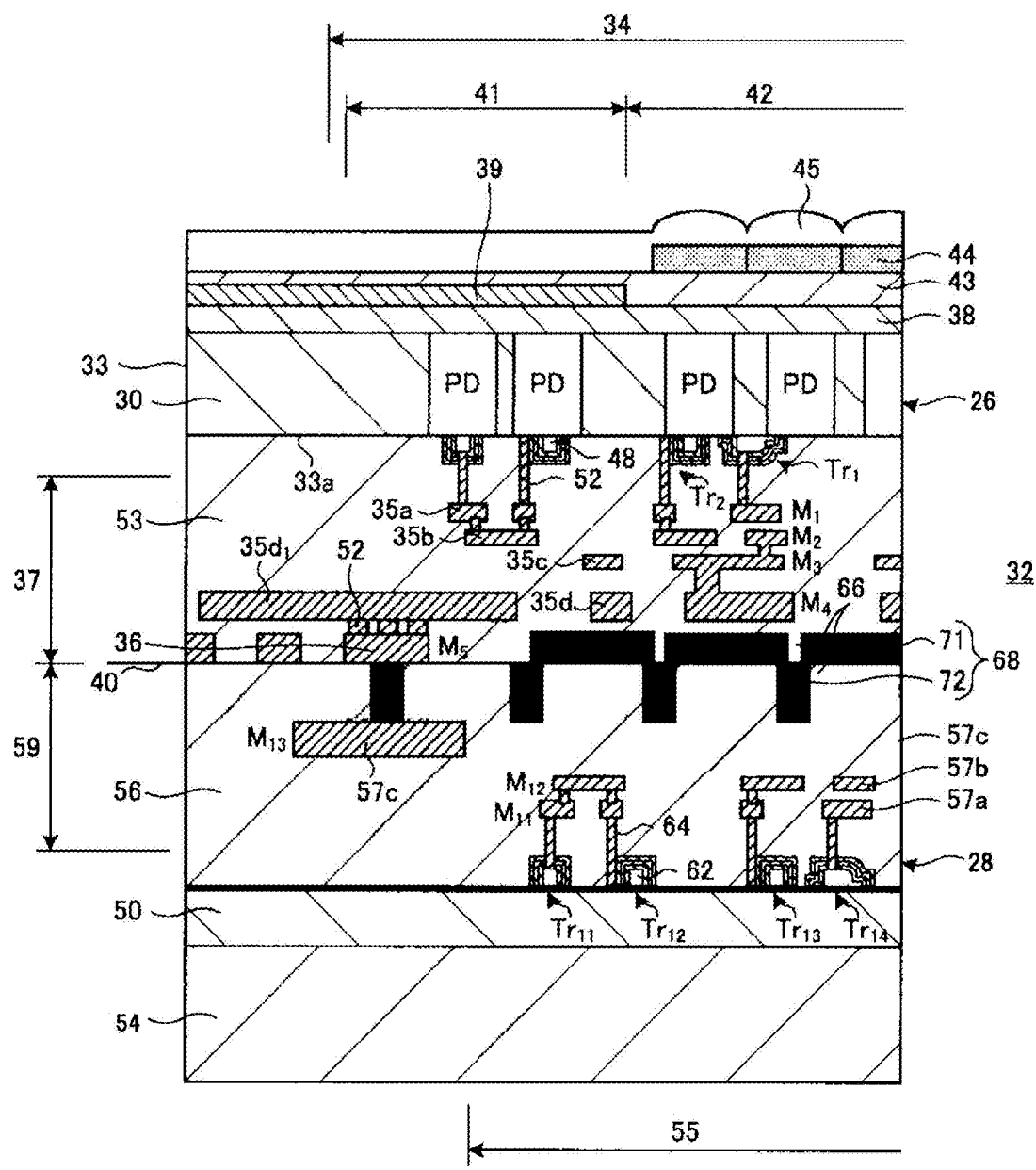
FIG. 17 is a schematic diagram depicting important parts of a solid-state image sensor according to a second embodiment of the present technology.

The following which refers to FIG. 17 describes the solid-state image sensor according to a second embodiment of the present technology. The second embodiment differs from the first embodiment (depicted in FIG. 16) in that the connecting wiring 36 and the wiring 57c of metal M13 are connected to each other through the light-shielding part 72, without the conductive via 64 being formed for the wiring layer 58 and the light-shielding part 72. The solid-state image sensor 31 according to the second embodiment produces the similar effect to that in the solid-state image sensor 31 according to the first embodiment. Moreover, it offers the advantage in the reduction of producing processes and production cost which accrues from not forming the conductive via 64.

<5. Solid-State Image Sensor According to Third Embodiment>

Figure 18:
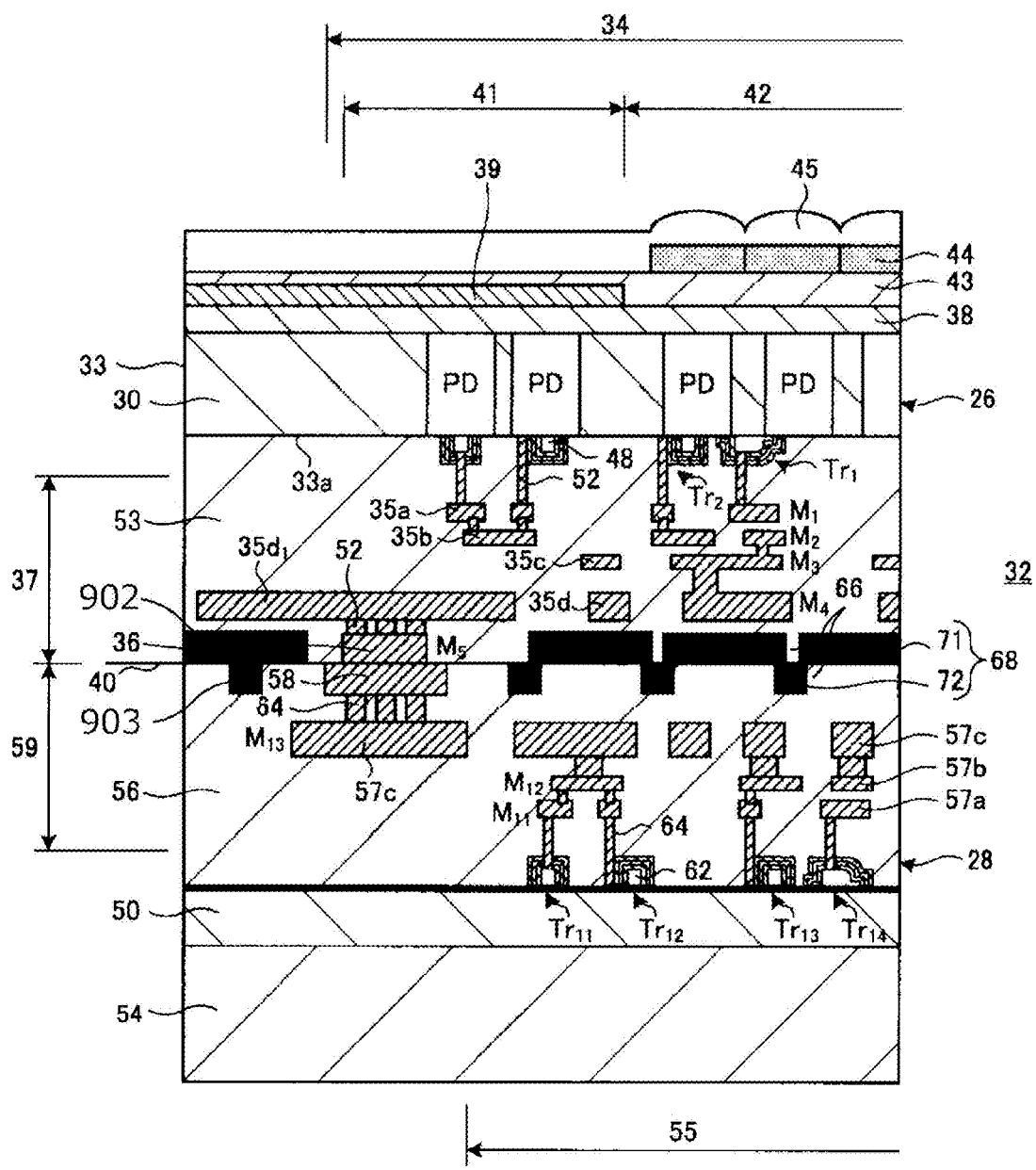
FIG. 18 is a schematic diagram depicting important parts of a solid-state image sensor according to a third embodiment of the present technology.

The following which refers to FIG. 18 describes the solid-state image sensor according to a third embodiment of the present technology. The third embodiment differs from the first embodiment (depicted in FIG. 16) in that a wiring 902 and a wiring 903 are bonded together asymmetrically, with the wiring 902 having a larger connecting area and the wiring 903 having a smaller connecting area, like the light-shielding layer 68, even in the case where the connecting wiring 36 and the wiring 58 are used for power supply. The solid-state image sensor 31 according to the third embodiment produces the similar effect to that in the solid-state image sensor 31 according to the first embodiment. Moreover, it offers the advantage of suppressing voids which are likely to occur at the time of bonding. This results from the wirings 902 and 903 differing in connecting area in addition to the light-shielding layer 68.

<6. Solid-State Image Sensor According to Fourth Embodiment>

Figure 19:
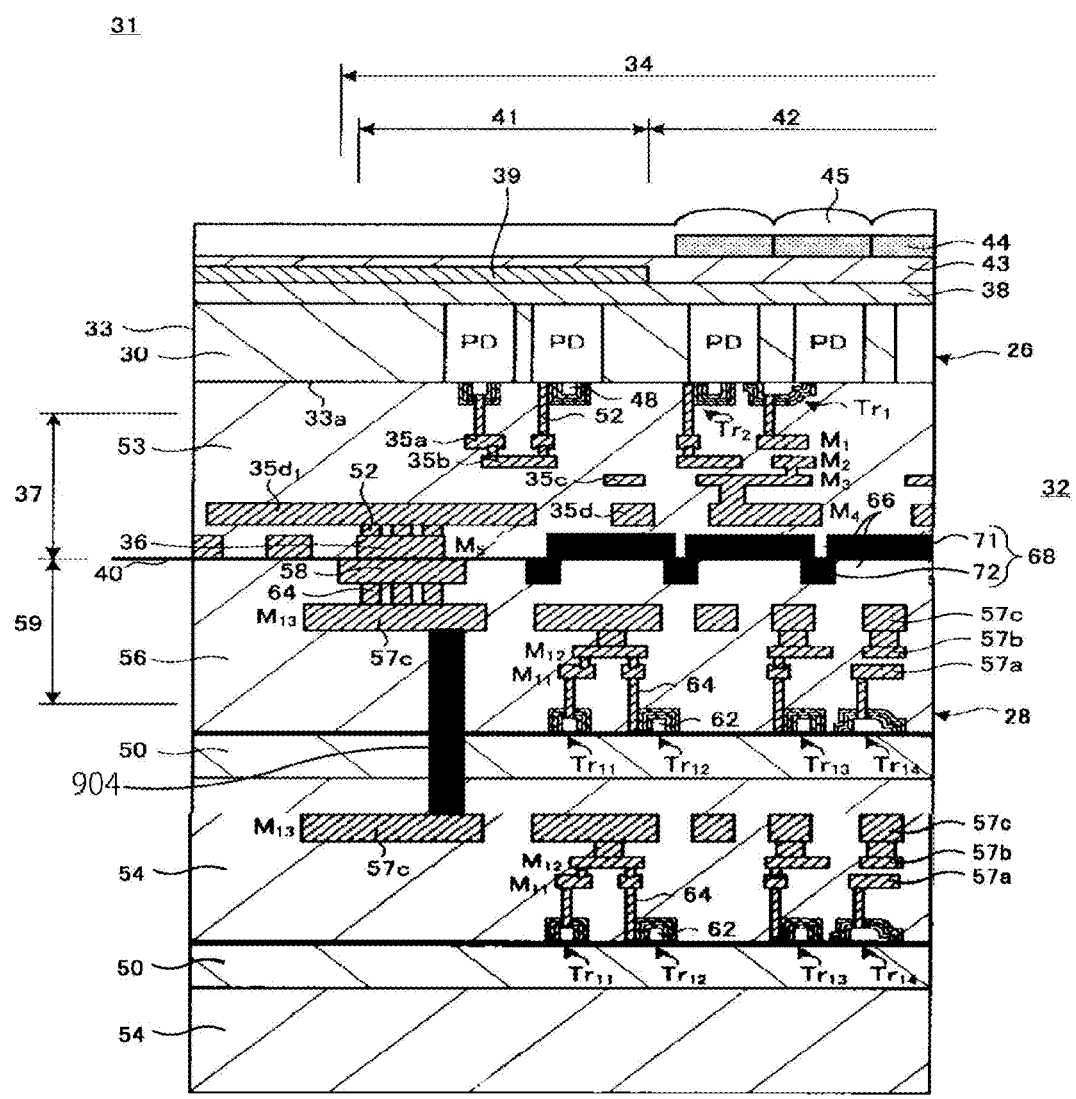
FIG. 19 is a schematic diagram depicting important parts of a solid-state image sensor according to a fourth embodiment of the present technology.

The following which refers to FIG. 19 describes the solid-state image sensor according to a fourth embodiment of the present technology. The fourth embodiment differs from the first embodiment (depicted in FIG. 16) in that the second semiconductor chip 28 includes two layers of the second semiconductor substrate 54 which are laminated one over another. The interlayer insulating film and the second semiconductor substrate 54 adjacent thereto have the wirings 57c electrically connected to each other through a wiring 904. The solid-state image sensor 31 according to the fourth embodiment produces the similar effect to that in the solid-state image sensor 31 according to the first embodiment. Incidentally, the solid-state image sensor according to the present technology may include four or more layers of the semiconductor substrate, without being restricted to three or less layers.

<7. Solid-State Image Sensor According to Fifth Embodiment>

The following which refers to FIGS. 20A to 22 describes the solid-state image sensor according to a fifth embodiment of the present technology. The fifth embodiment differs from the first embodiment (depicted in FIG. 16) in that the light-shielding layer 68 has not only the horizontal stripy pattern (depicted in FIG. 7) but also the slant stripy pattern or checkered pattern (in plan view).

Figure 20A:
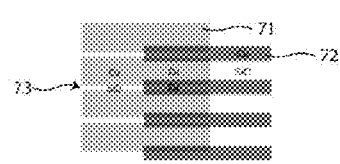
FIG. 20A is a diagram depicting how to constitute a light-shielding layer in the solid-state image sensor according to the first embodiment of the present technology.
Figure 20B:
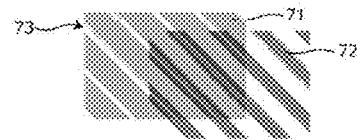
FIG. 20B is a diagram depicting how to constitute a light-shielding layer in a solid-state image sensor according to a fifth embodiment of the present technology.
Figure 20C:
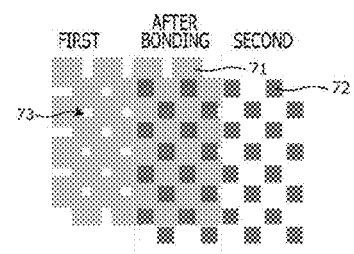
FIG. 20C is a diagram depicting how to constitute the light-shielding layer in the solid-state image sensor according to the fifth embodiment of the present technology.
Figure 20D:
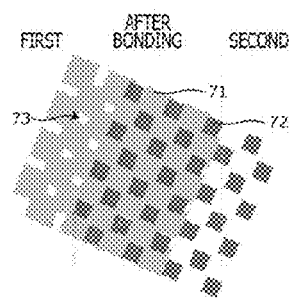
FIG. 20D is a diagram depicting how to constitute the light-shielding layer in the solid-state image sensor according to the fifth embodiment of the present technology.

FIG. 20A depicts the light-shielding layer 68 which has a horizontal stripy pattern (in plan view) as in the first embodiment. Incidentally, the light-shielding parts 71 and 72 may be identical or different in width in their longitudinal direction. FIG. 20B depicts the light-shielding layer 68 which has a slant stripy pattern (in plan view) extending from the upper left to the lower right. FIG. 20C depicts the light-shielding layer 68 which has a checkered pattern (in plan view). The light-shielding layer 68 includes the light-shielding part 71 and the light-shielding part 72 which overlap each other in such a way that each of the rectangular areas in the latter covers each of the rectangular openings 73 in the former, with the rectangular area having a larger area than the rectangular opening 73. Incidentally, "rectangular" includes "square." FIG. 20D depicts the light-shielding layer 68 having a slant checkered pattern which is formed by turning the checkered pattern of FIG. 20C in the clockwise direction through a certain degree of angle.

Figure 21:
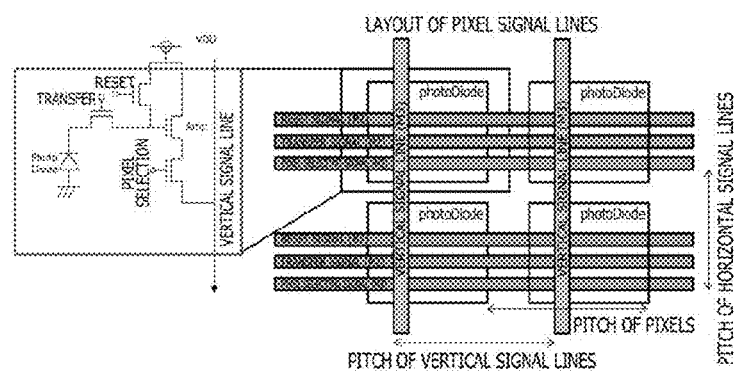
FIG. 21 is an enlarged view depicting a layout of signal lines in a pixel array according to the fifth embodiment.

The solid-state image sensor according to the present embodiment has the pixel array whose signal wire layout is depicted in FIG. 21 (enlarged view). According to the present embodiment, the pixel array 23 includes a plurality of photodiodes which are arranged in the horizontal and vertical directions. Moreover, the pixel array 23 has reset signal lines M21, transfer signal lines M22, and pixel selecting signal lines M23, which are arranged horizontally at a certain pitch. The pixel array 23 also has the vertical signal lines M3, which are arranged vertically at a certain pitch.

Figure 22A:
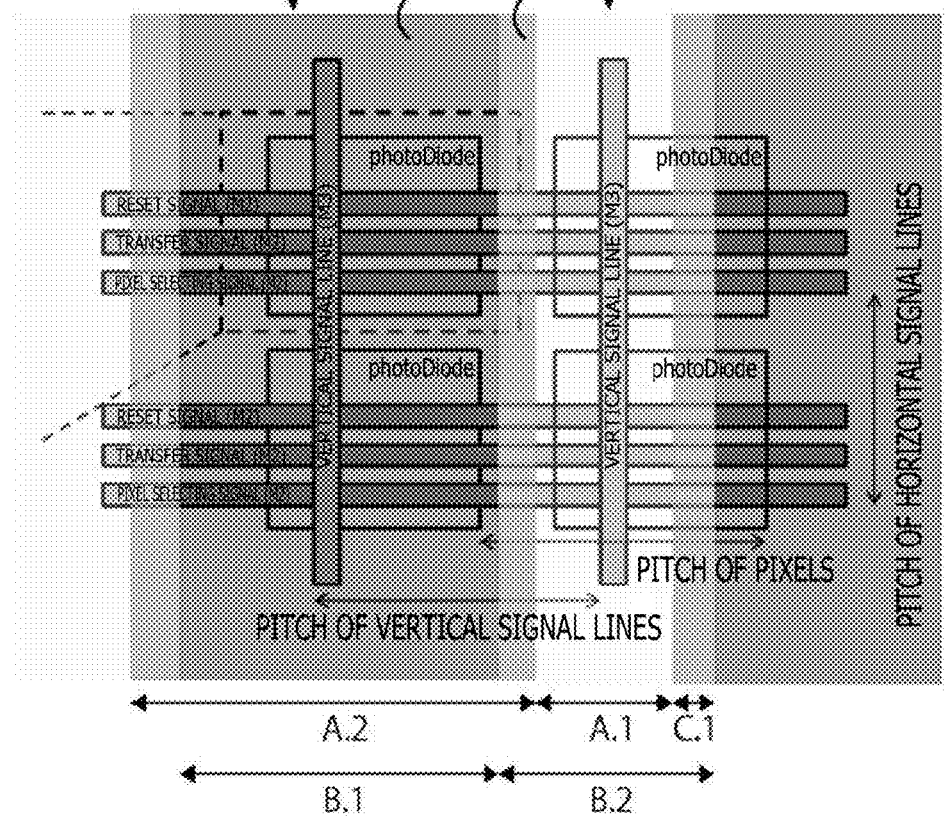
FIG. 22A is a diagram illustrating a layout of a shield layer according to the fifth embodiment.
Figure 22B:
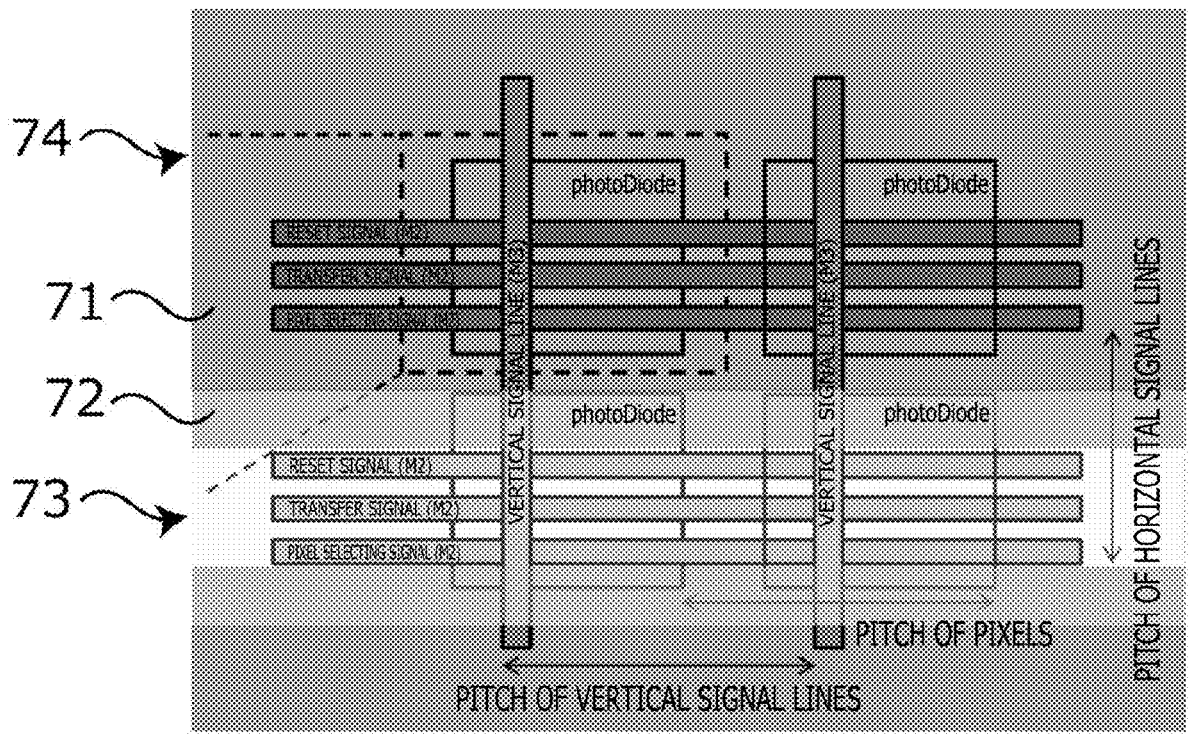
FIG. 22B is a diagram illustrating the layout of the shield layer according to the fifth embodiment.
Figure 22C:
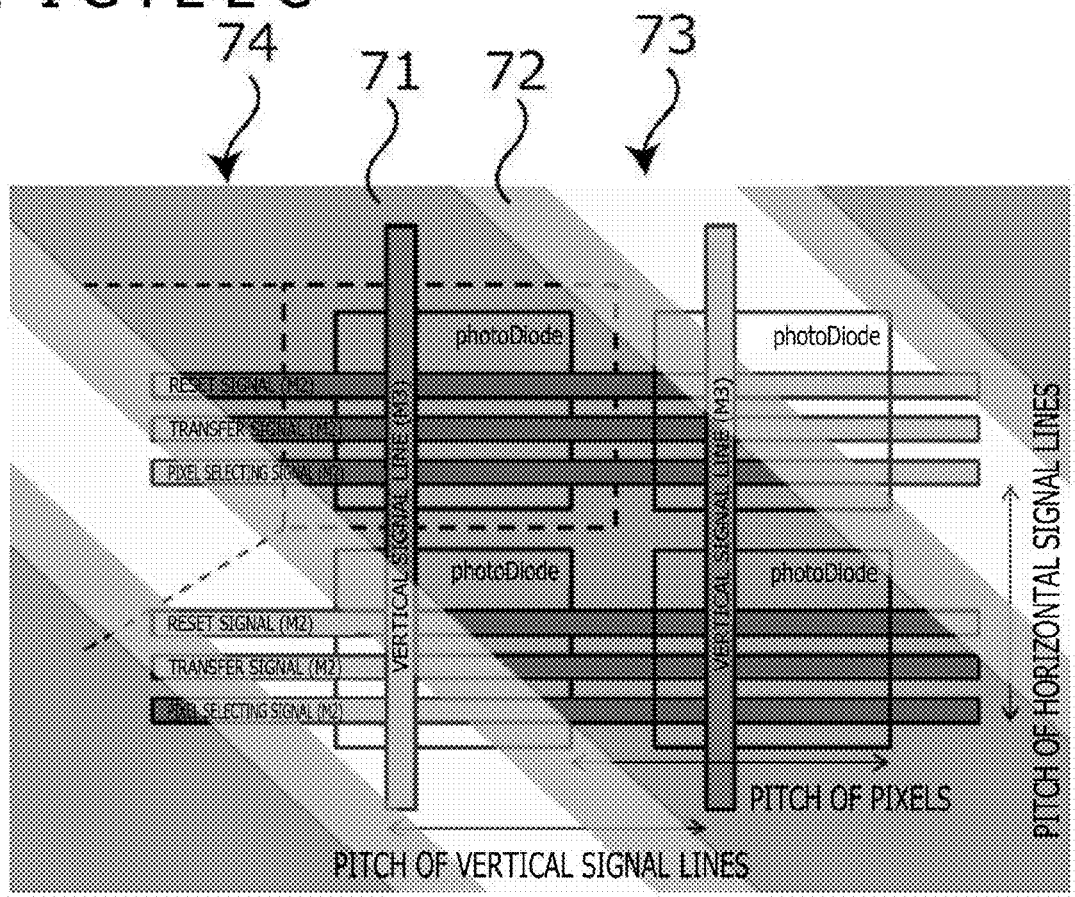
FIG. 22C is a diagram illustrating the layout of the shield layer according to the fifth embodiment.

The solid-state image sensor according to the present embodiment has the shield layer whose layout is depicted in FIGS. 22A to 22C.

The light-shielding layer (shield layer) 68 depicted in FIG. 22A (top view) includes the light-shielding parts 71 and 72 which are so arranged as to form the vertical stripy pattern, with a plurality of openings 73 and 74 left at a certain pitch. The vertical shielding layer like this is liable to cause the vertical signal line M3 to fluctuate in its total capacity because of the difference that occurs between the vertical signal line M3 and the shield layer 68.

The shield layer 68 depicted in FIG. 22B (top view) includes the light-shielding parts 71 and 72 which are so arranged as to form the horizontal stripy pattern, with a plurality of openings 73 and 74 left at a certain pitch. The horizontal shield like this is liable to cause the horizontal signal lines M21 to M23 to fluctuate in their total capacity because of the difference that occurs between the horizontal control lines M21 to M23 and the shield layer 68.

The shield layer 68 depicted in FIG. 22C (top view) includes the light-shielding parts 71 and 72 which are so arranged as to form the slant stripy pattern, with a plurality of openings 73 left at a certain pitch from the upper left to the lower right. The slant shield like this will be free from fluctuation in the total capacity because the interlayer capacity will be uniform between the vertical signal line M3 and the shield layer 68 for each of the horizontal control lines M21 to M23. The result is lower band noise in the solid-state image sensor than that with the vertical or horizontal stripy pattern.

The result of arranging, as mentioned above, the shield layers 68 aslant in a stripy or checkered pattern at regular intervals with respect to the horizontal signal lines M21 to M3 and the vertical signal line M3 of the logic circuit 55 makes the capacity uniform between the shield layer 68 and each of the signal lines throughout the entire pixel array 23. The result is reduced electrical noise in the solid-state image sensor 31. Moreover, the attempt to prevent reflection by arranging aslant the shield layer 68 in a stripy pattern which does not intersect at right angles with all the signal lines will make the effect of capacity coupling uniform.

<8. Electronic Device According to Sixth Embodiment>

Figure 23:
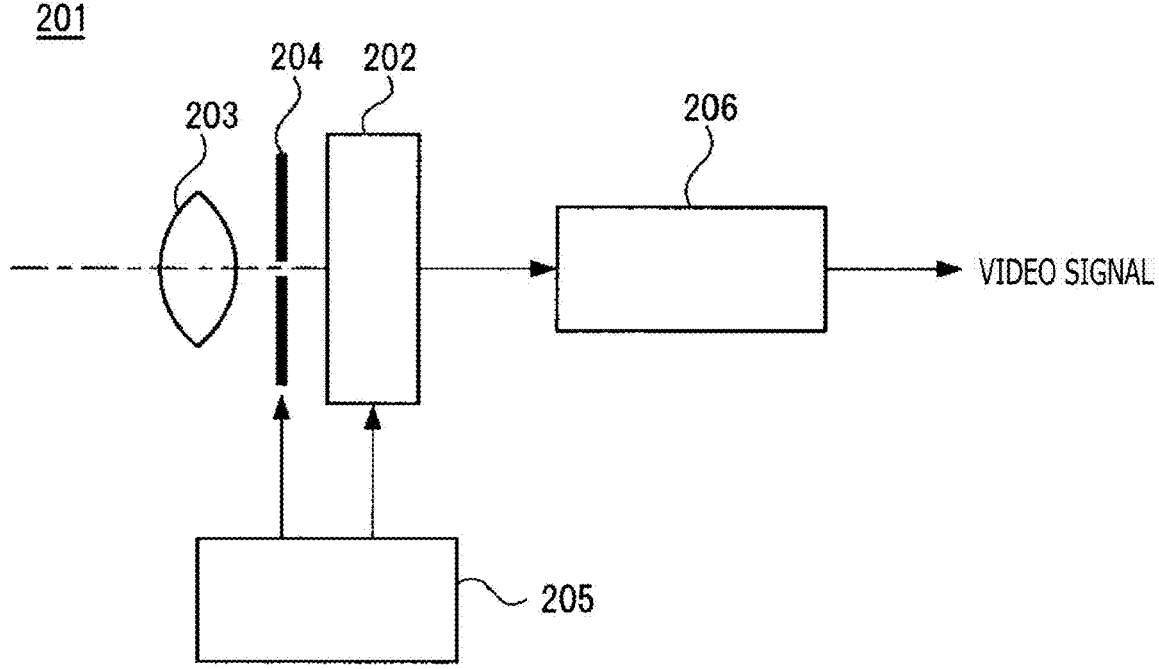
FIG. 23 is a schematic diagram illustrating constitution of an electronic device according to a sixth embodiment of the present technology.

The following is a description of the solid-state image sensor according to a sixth embodiment of the present technology, which is depicted in FIG. 23.

FIG. 23 is a diagram illustrating the electronic device according to the present technology. The electronic device according to the present technology described above includes, for example, camera systems (such as digital camera and video camera), portable telephones (with imaging function), and others (with imaging function), to which is applied the solid-state image sensor according to the present technology.

FIG. 23 illustrates the sixth embodiment which demonstrates a camera as an example of the electronic device according to the present technology. The camera covered in the present embodiment is exemplified by a video camera capable of taking static images or dynamic images. A camera 201 according to the present embodiment includes a solid-state image sensor 202, an optical system 203 to lead the incident light to the photodetector of the solid-state image sensor 202, and a shutter 204. It also includes a drive circuit 205 to drive the solid-state image sensor 202 and a signal processing circuit 206 to process the output signals from the solid-state image sensor 202.

The solid-state image sensor 202 may be selected from the solid-state image sensors pertaining to the foregoing embodiments. The optical system (or optical lens) 203 focuses the incident light from the subject on the sensitive surface of the solid-state image sensor 202. This process causes the solid-state image sensor 202 to accumulate signal charges for a certain period of time. The optical system 203 may be an optical lens including a plurality of optical lenses.

The shutter 204 controls the length of the period in which the solid-state image sensor 202 is exposed to and shut off from the incident light. The drive circuit 205 transmits the drive signal to control the solid-state image sensor 202 for its transmitting action and the shutter 204 for its shutter action. The solid-state image sensor 202 transmits signals in response to the drive signal (timing signal) received from the drive circuit 205. The signal processing circuit 206 processes various signals. After having undergone signal processing, the video signals are stored in a storage medium (or memory) or dispatched to the monitor.

Having the solid-state image sensor 202 of the back-illuminated type which is defined in the present technology, the electronic device according to the sixth embodiment makes the pixel array free from the light emanating from the hot carriers of the MOS transistors in the logic circuit, thereby suppressing dark current and random noise. This leads to the electronic device, such as camera, capable of producing high-quality photographs, for example.

The embodiments according to the present technology are not restricted to the embodiments mentioned above; they may be modified in various ways within the scope of the present technology. More than one of the forgoing embodiments may be combined together or partly, for example.

The present technology may be embodied as follows.

(1) A solid-state image sensor including at least:
a first semiconductor chip carrying thereon one or more than one of a first conductor and a pixel array; and
a second semiconductor chip which bonds to the first semiconductor chip and carries thereon one or more than one of a second conductor and a logic circuit,
in which the first semiconductor chip and the second semiconductor chip are bonded together in such a way that the first conductor and the second conductor overlap with each other and are electrically connected to each other, and
the bonding occurs such that the first conductor and the second conductor differ from each other in area of their bonding surfaces.

(2) The solid-state image sensor according to Paragraph (1), in which the bonding occurs such that the area of smaller bonding surface for the conductor accounts for equal to or more than 70% of the area of larger bonding surface for the conductor.

(3) The solid-state image sensor according to Paragraph (1), in which the bonding occurs such that the area of smaller bonding surface for the conductor accounts for equal to or more than 60% of the area of larger bonding surface for the conductor.

(4) The solid-state image sensor according to Paragraph (1), in which the region of the bonding surfaces in which the first conductor and the second conductor are formed is blocked by one of the first conductor and the second conductor.

(5) The solid-state image sensor according to Paragraph (1), in which the region of the bonding surfaces in which the first conductor and the second conductor are formed has apertures at some parts.

(6) The solid-state image sensor according to Paragraph (1), in which the first semiconductor chip has a wiring and a connecting hole formed therein to fix the potential of the first conductor and the second conductor.

(7) The solid-state image sensor according to Paragraph (1), in which the second semiconductor chip has a wiring and a connecting hole formed therein to fix the potential of the first conductor and the second conductor.

(8) The solid-state image sensor according to Paragraph (1), in which the first conductor and the second conductor are each arranged closer to the bonding surface than the logic circuit and a wiring which are formed on the first semiconductor chip and the second semiconductor chip.

(9) The solid-state image sensor according to Paragraph (1), in which the region in which the first conductor and the second conductor are formed is equal to or larger than the region in which the pixel array is formed.

(10) The solid-state image sensor according to Paragraph (1), in which the first conductor and the second conductor are formed in plural number such that they are aslant to the direction of a signal line of an analog circuit which is formed in the first semiconductor chip and the second semiconductor chip.

(11) A method for producing a solid-state image sensor, the method including:
a step of preparing a first semiconductor chip which has a first conductor and a pixel array formed thereon in singular or plural number;

a step of preparing a second semiconductor chip which has a second conductor and a logic circuit formed thereon in singular or plural number; and a step of placing the first conductor formed on the first semiconductor chip and the second conductor formed on the second semiconductor chip one over the other for electrical connection, in which the first semiconductor chip and the second semiconductor chip are bonded to each other in such a way that the first conductor and the second conductor differ from each other in area of their bonding surfaces.

(12) An electronic device including:

a solid-state image sensor including at least
  a first semiconductor chip carrying thereon one or more than one of a first conductor and a pixel array, and
  a second semiconductor chip which bonds to the first semiconductor chip and carries thereon one or more than one of a second conductor and a logic circuit;
the first semiconductor chip and the second semiconductor chip being bonded together in such a way that the first conductor and the second conductor overlap with each other and are electrically connected to each other;
the bonding occurring such that the first conductor and the second conductor differ from each other in area of their bonding surfaces.

REFERENCE SIGNS LIST 1, 1a to 1c, 31: Solid-state image sensor
2: Pixel
3, 23, 34: Pixel array (pixel region)
4: Vertical drive circuit
5: Column signal processing circuit
6: Horizontal drive circuit
7: Output circuit
8, 24, 24-1, 24-2: Control circuit
9: Vertical signal line
10: Horizontal signal line
21, 33: First semiconductor substrate
22, 54: Second semiconductor substrate
25, 55: Logic circuit
26: First semiconductor chip
28: Second semiconductor chip
30, 50: Semiconductor well region
32: Laminated semiconductor chip
33a: Surface
35a to 35d, 36, 57a to 57c, 58, 902 to 904: Wirings
37, 59: Multilayered wiring layer
38: Insulating film
39: Light-shielding film
40: Bonding surface
41: Optical black region
42: Effective pixel array
43: Planarized film
44: Color filter
45: On-chip lens
47, 48: P-type semiconductor region
49, 61: Source-drain region
51, 63: Element-separating region
52, 64: Conductive via
53, 56, 66: Interlayer insulating film
62: Gate electrode
68: Light-shielding layer
71: Light-shielding part (first conductor)
72: Light-shielding part (second conductor)
73, 74, 78, 79, 84, 85: Opening
75, 81: Insulating film capable of blocking copper diffusion
76, 82: First insulating film
77, 83: Second insulating film
80, 86: Via hole
900, 901: Insulating thin film
PD: Photodiode
Tr1, Tr2: Pixel transistor
M1 to M5, M13, M14: Metal
FD: Floating diffusion
Tr11 to Tr14: MOS transistor

The invention claimed is:

1. A solid-state image sensor, comprising:
a first semiconductor chip including a first conductor and a pixel array; and
a second semiconductor chip bonded to the first semiconductor chip and including a second conductor and a logic circuit,
wherein the first semiconductor chip and the second semiconductor chip are bonded together such that the first conductor and the second conductor overlap with each other and are electrically connected to each other,
wherein the first conductor and the second conductor are formed of copper,
wherein the second semiconductor chip includes at least a first semiconductor layer and a second semiconductor layer,
wherein the at least the first semiconductor layer and the second semiconductor layer are electrically connected to each other by way of a through wiring, and
wherein only one portion of the second conductor does not overlap with a pair of consecutive first conductors along a vertical direction for each second conductor.

2. The solid-state image sensor according to claim 1, wherein the at least the first semiconductor layer and the second semiconductor layer are laminated to each other.

3. The solid-state image sensor according to claim 1, further comprising at least a third layer of the second semiconductor chip.

4. The solid-state image sensor according to claim 1, wherein the bonding occurs such that an area of a bonding surface of the first conductor is equal to or more than 70% of an area of a bonding surface of the second conductor.

5. The solid-state image sensor according to claim 1, wherein the bonding occurs such that an area of a bonding surface of the first conductor is equal to or more than 60% of an area of a bonding surface of the second conductor.

6. The solid-state image sensor according to claim 1, wherein a region in which a bonding surface of the first conductor and a bonding surface of the second conductor are formed is blocked by one of the first conductor and the second conductor.

7. The solid-state image sensor according to claim 1, wherein a region in which a bonding surface of the first conductor and a bonding surface of the second conductor are formed includes apertures.

8. The solid-state image sensor according to claim 1, wherein the first semiconductor chip has a wiring and a connecting hole formed therein to fix a potential of the first conductor and to fix a potential of the second conductor.

9. The solid-state image sensor according to claim 1, wherein the second semiconductor chip has a wiring and a connecting hole formed therein to fix a potential of the first conductor and to fix a potential of the second conductor.

10. The solid-state image sensor according to claim 1, wherein the first conductor is closer to a bonding surface than a control circuit formed on the first semiconductor chip, and wherein the second conductor is closer to a bonding surface than the logic circuit formed on the second semiconductor chip.

11. The solid-state image sensor according to claim 1, wherein a first region in which the first conductor and the second conductor are formed is equal to or larger than a second region in which the pixel array is formed.

12. An electronic device, comprising:
a solid-state image sensor including:
a first semiconductor chip including a first conductor and a pixel array; and
a second semiconductor chip bonded to the first semiconductor chip and including a second conductor and a logic circuit,
wherein the first semiconductor chip and the second semiconductor chip are bonded together such that the first conductor and the second conductor overlap with each other and are electrically connected to each other,
wherein the first conductor and the second conductor are formed of copper,
wherein the second semiconductor chip includes at least a first semiconductor layer and a second semiconductor layer,
wherein the at least the first semiconductor layer and the second semiconductor layer are electrically connected to each other by way of a through wiring, and
wherein only one portion of the second conductor does not overlap with a pair of consecutive first conductors along a vertical direction for each second conductor.

13. The electronic device according to claim 12, wherein the at least the first semiconductor layer and the second semiconductor layer are laminated to each other.

14. The electronic device according to claim 12, further comprising at least a third layer of the second semiconductor chip.

15. The electronic device according to claim 12, wherein the bonding occurs such that an area of a bonding surface of the first conductor is equal to or more than 70% of an area of a bonding surface of the second conductor.

16. The electronic device according to claim 12, wherein the bonding occurs such that an area of a bonding surface of the first conductor is equal to or more than 60% of an area of a bonding surface of the second conductor.

17. The electronic device according to claim 12, wherein a region in which a bonding surface of the first conductor and a bonding surface of the second conductor are formed is blocked by one of the first conductor and the second conductor.

18. The electronic device according to claim 12, wherein a region in which a bonding surface of the first conductor and a bonding surface of the second conductor are formed includes apertures.

19. The electronic device according to claim 12, wherein the first semiconductor chip has a wiring and a connecting hole formed therein to fix a potential of the first conductor and to fix a potential of the second conductor.

20. The electronic device according to claim 12, wherein the second semiconductor chip has a wiring and a connecting hole formed therein to fix a potential of the first conductor and to fix a potential of the second conductor.

* * * * *